US008250654B1

(12) United States Patent
Kennedy et al.

(10) Patent No.: US 8,250,654 B1
(45) Date of Patent: Aug. 21, 2012

(54) SYSTEMS AND METHODS FOR IMPLEMENTING AND SCORING COMPUTER NETWORK DEFENSE EXERCISES

(75) Inventors: Scott Cruickshanks Kennedy, San Diego, CA (US); Carleton Royse Ayers, II, San Diego, CA (US); Javier Godinez, Le Mesa, CA (US); Susan Fichera Banks, Carlsbad, CA (US); Myoki Elizabeth Spencer, San Diego, CA (US)

(73) Assignee: Science Applications International Corporation, San Diego, CA (US)

( * ) Notice: Subject to any disclaimer, the term of this patent is extended or adjusted under 35 U.S.C. 154(b) by 522 days.

(21) Appl. No.: 12/492,242

(22) Filed: Jun. 26, 2009

Related U.S. Application Data

(63) Continuation-in-part of application No. 11/340,726, filed on Jan. 27, 2006.

(60) Provisional application No. 60/647,009, filed on Jan. 27, 2005.

(51) Int. Cl.
*G06F 11/00* (2006.01)

(52) U.S. Cl. .............. 726/22; 726/24; 726/25; 713/187; 713/188

(58) Field of Classification Search .................... 726/22, 726/24, 25; 713/187, 188
See application file for complete search history.

(56) References Cited

U.S. PATENT DOCUMENTS

| | | | | |
|---|---|---|---|---|
| 7,023,979 | B1 | 4/2006 | Wu et al. | 379/265.11 |
| 7,133,896 | B2 | 11/2006 | Ogdon et al. | 709/205 |
| 7,213,260 | B2 | 5/2007 | Judge | 726/3 |
| 2002/0178383 | A1 | 11/2002 | Hrabik et al. | 713/201 |
| 2002/0188887 | A1 | 12/2002 | Largman et al. | 714/13 |
| 2003/0056116 | A1 | 3/2003 | Bunker et al. | 713/201 |
| 2003/0167410 | A1 | 9/2003 | Rigstad et al. | 726/1 |
| 2003/0172145 | A1 | 9/2003 | Nguyen et al. | 709/223 |

*Primary Examiner* — Christopher Brown
(74) *Attorney, Agent, or Firm* — King & Spalding LLP

(57) ABSTRACT

A process for facilitating a client system defense training exercise implemented over a client-server architecture includes designated modules and hardware for protocol version identification message; registration; profiling; health reporting; vulnerability status messaging; storage; access and scoring. More particularly, the server identifies a rule-based vulnerability profile to the client and scores client responses in accordance with established scoring rules for various defensive and offensive asset training scenarios.

10 Claims, 40 Drawing Sheets

```
<server>
  <message>
      ...
  </message>
  <time>Thu Dec  4 14:24:51 PST 2008</time>
  <msgid>973792</msgid>
  <session>03299a1eaacd37c98da5500f64d677a3</session>
</server>
```

FIGURE 20

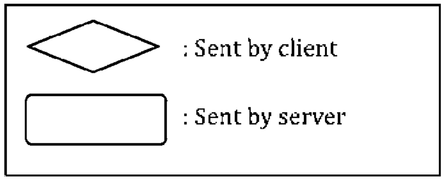
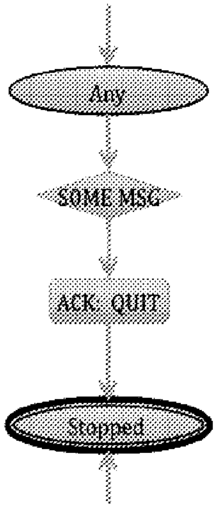
FIGURE 21a
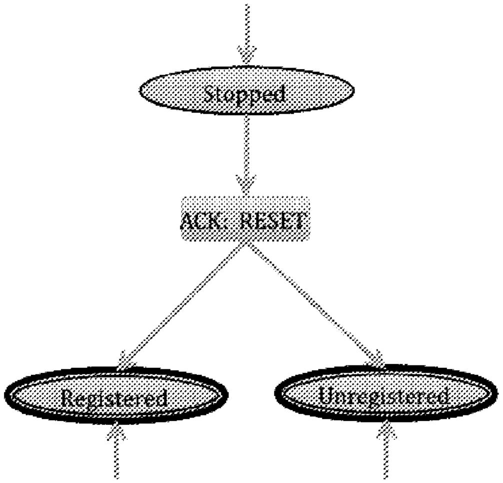
FIGURE 21b
```
<server>
    <message type="ACK">
            <acknowledge>OK</acknowledge>
    </message>
</server>
```
FIGURE 21c

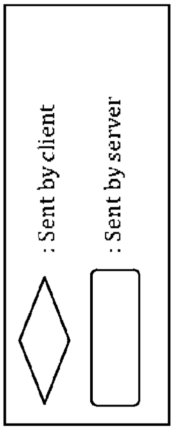
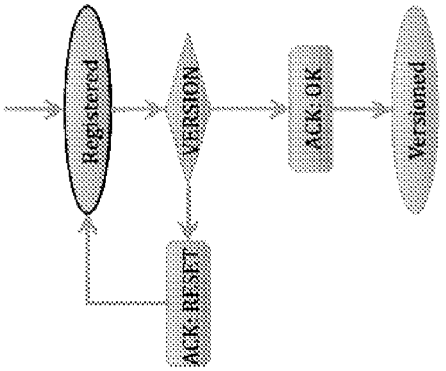
FIGURE 22a
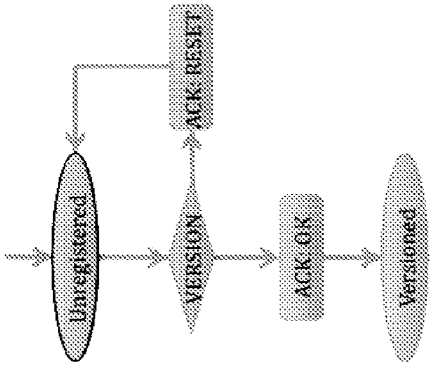
FIGURE 22b
```
<server>
   <message type="VERSION">
      <version>1.0</version>
   </message>
</server>
```
FIGURE 22c

```
<server>
    <message type="REGISTER">
        <id>
            <hostname>SERV2</hostname>
            <networks>
                <network>
                <ip-address>192.168.1.100</ip-address>
                    <subnet-mask>255.255.255.0</subnet-mask>
                    <gateway>192.168.1.1</gateway>
                    <mac-address>FA:CE:00:44</mac-address>
                </network>
            </networks>
            <kernel>kernel.dll build 33421</kernel>
            <processors>
                <number>2</number>
                <description>Intel Xeon 2.4 GHz</description>
            </processors>
            <ram>4G</ram>
        <id>
    </message>
</server>
```

FIGURE 23b

```
<server>
    <message type="SID">
            <sid>aacd-37c9-8da5-0329-9a1e-500f-64d6-77a3</sid>
    </message>
</server>
```

FIGURE 24

```
<server>
  <message type="BOOT">
      <boot>DOWN</boot>
    </message>
</server>
```

```
<server>
    <message type="HEALTH">
            <cpu no="0">99</cpu>
            <cpu no="1">8</cpu>
            <mem>44</mem>
            <disks>
                    <part>
                            <name>C:</name>
                            <full>40</full>
                    </part>
                    <part>
                            <name>D:</part>
                            <full>100</full>
                    </part>
            </disks>
            <interfaces>
                    <interface>
                            <name>Connection 1</name>
                            <up>32</up>
                            <down>14</down>
                    </interface>
            <interfaces>
    </message>
</server>
```

```
<server>
    <message type="FIREWALL">
            <status>up</status>
            <changes>
                        <rule>INCOMING PORT(S) BLOCKED: ALL</rule>
                        <rule>ALLOW TCP PORT 443 FROM * TO *<rule>
            </changes>
    </message>
</server>
```

```
<server>
    <message type="SERVICE">
            <name>World Wide Web Publishing Service</name>
            <action>stopped</action>
            <reason>crashed</reason>
    </message>
</server>
```

```
<server>
  <message type="PORTS">
    <ports>
      <open>
        <tcp>
          <port>135</port>
          <port>80</port>
          <port>443</port>
        </tcp>
      </open>
      <closed>
        <tcp>
          <port>21</port>
        </tcp>
        <udp>
          <port>160</port>
        </udp>
      </closed>
    </ports>
  </message>
</server>
```

```
<server>
    <message type="VULNFIXED">
            <vulns>
                        <vuln>
                                    <id>1342</id>
                        </vuln>
            </vulns>
    </message>
</server>
```

FIGURE 30

```
<server>
    <message type="VULNS">
            <fixed>
                    <vulns>
                            <vuln>
                                    <id>1342</id>
                            </vuln>
                            <vuln>
                                    <id>9392</id>
                            </vuln>
                    </vulns>
            </fixed>
            <existing>
                    <vulns>
                            <vuln>
                                    <id>9165</id>
                            </vuln>
                    </vulns>
            </existing>
    </message>
</server>
```

```
<client>
  <message type="VERSION">
      <version>1.0</version>
    </message>
</client>
```

FIGURE 32

```
<client>
  <message type="ACK">
      <acknowledge>OK</acknowledge>
    </message>
</client>
```

FIGURE 33

```
<client>
  <message type="SESSION">
      <session>37c9aa0329cd85077a30fda64d659a1e</session>
      <expire>3600000</expire>
    </message>
</client>
```

```
<client>
    <message type="PROFILE">
        <profile name="WIN WEB SERVER">
            <sid>aacd-37c9-8da5-0329-9a1e-500f-64d6-77a3</sid>
            <vulns>
                <vuln>
                    <id>1342</id>
                    <services>
                        <service>
                            <name>Print Spooler</name>
                            <action>disable</action>
                        </service>
                    </services>
                </vuln>
                <vuln>
                    <id>9392</id>
                    <keys prec=1>
                        <key>
                            <keyname>HKE\...\Server</keyname>
                            <valuename>Enabled</valuename>
                            <value>0</value>
                        </key>
                    </keys>
                    <services prec=2>
                        <service>
                            <name>World Wide Web Service</name>
                            <action>restart</action>
                        </service>
                    </services>
                </vuln>
                <vuln>
                    <id>9165</id>
                    <bin prec=1>
                        <file>c:\windoows\commctrl32.dll</file>
                        <version>3299</version>
                        <md5>4AB502...04EAB</md5>
                    </bin>
                    <services prec=2>
                        <service>
                            <name>OS</name>
                            <action>restart</action>
                        </service>
                    </services>
                </vuln>
            </vulns>
        </profile>
    </message>
</client>
```

FIGURE 35

```
<client>
    <message type="PASS CHECK">
            <auth>
                        <username>admin</username>
                        <password>someweakpass</password>
            </auth>
    </message>
</client>
```

FIGURE 36

```
<client>
    <message type="THROTTLE">
            <seconds>15</seconds>
            <minutes>2</minutes>
            <hours>0</hours>
    </message>
</client>
```

FIGURE 37

```
<client>
    <message type="GETPORTS"/>
</client>
```

FIGURE 38

```
<client>
    <message type="GETVULNS"/>
</client>
```

FIGURE 39

SYSTEMS AND METHODS FOR IMPLEMENTING AND SCORING COMPUTER NETWORK DEFENSE EXERCISES

CROSS-REFERENCE TO RELATED APPLICATIONS

This application is a continuation-in-part of U.S. application Ser. No. 11/340,726 filed Jan. 27, 2006, which application claims benefit of, and hereby incorporates herein in its entirety, U.S. Provisional Patent Application No. 60/647,009, filed Jan. 27, 2005.

BACKGROUND OF THE INVENTION

1. Field of the Invention

Embodiments of the invention relate to computer security. Specific embodiments relate to training information technology (IT) staff in the attack and/or defense of computer systems and networks.

2. Description of Related Art

Maintaining computer network security is becoming an increasingly difficult task. The internal (insider) threat has historically accounted for the greatest amount of misuse activity; and its consequence affects even the most trusted networks. Whether intentional or through improper procedure, the insider threat has resulted in lost productivity, espionage and fraud. The Internet plays an ever-increasing role in our national IT infrastructure as its ubiquitous nature provides a very cost-effective and high availability communication network. This world-wide infrastructure complements the trusted networks providing long-haul communications as well as remote management connectivity to Supervisory Control and Data Acquisition (SCADA) units connected to critical enterprise operations. The widening use of the Internet introduces increased exposure to the external threat such as corporate spies, cyber terrorists, and a growing number of "wannabe" hackers.

While higher-profile exploits (primarily external threats) such as "Code Red," "Nimda," "Blaster," "Sasser," and "Conflicker" are covered by the media, many more cyber incidents go unpublicized; at times because system administrators and security personnel are often ill-prepared to recognize, mitigate, and document cyber incidents. Compounding the situation is that knowledgeable hackers can use the aggregated power of low-value compromised systems to execute a coordinated attack against a more critical, better defended system. As such, most any IT resource connected to the Internet, regardless of its importance, becomes a weak link in the IT infrastructure if left unprotected. To protect these networks and resources, strong information assurance measures must be put in place to ensure the uninterrupted, reliable operation of these critical enterprise systems in the face of both internal and external threats.

SUMMARY OF THE INVENTION

In an embodiment of the present invention, a process for facilitating a client system attack and/or defense training exercise is implemented over a client-server architecture. The process includes: sending a protocol version identification message by a client system including at least one computer to a first server for determining a the protocol version common to both the client computer and the first server; sending a registration request message by the client system to a first server for registering the client computer with the first server;

sending a system identification message by the client system to a first server for tracking the client identity; sending a profile message by the first server to the client system in response to successful registration by the client system, the profile message including a list of vulnerabilities with associated vulnerability identifiers (IDs) that the client is to monitor; sending a health message by the client system to the first server at predetermined intervals, the health message including information regarding at least one of client system CPU, memory, hard disk, network and interfaces; sending a vulnerability fixed message by the client system to the first server each time one of the vulnerabilities on the list of vulnerabilities has been fixed, the vulnerability fixed messages including the associated vulnerability ID for each fixed vulnerability; sending a list vulnerabilities message by the first server to the client system, requesting a listing of all current client system vulnerabilities by associated vulnerability ID; sending a list of current vulnerabilities message by the client system to the first server in response to the list vulnerabilities message from the first server; storing details from the profile message, one or more health messages, one or more vulnerability fixed messages and one or more list of current vulnerabilities messages in at least one database associated with the first server; accessing the details stored in at least one database by a second server; applying a set of scoring rules to the accessed details by the second server to determine an objective score for a client system administrator that is indicative of the client system administrator's ability to defend the client system against vulnerabilities.

In another embodiment of the present invention, a system for facilitating a client system defense training exercise implemented over a client-server architecture is described. The system includes: means for determining a protocol version common to both a client system including at least one computer and a first server; means for registering the client computer with the first server; means for tracking the client computer identity; means for generating a profile message in response to successful registration by the client system, the profile message including a list of vulnerabilities with associated vulnerability IDs that the client is to monitor; means for generating a health message including information regarding at least one of client system CPU, memory, hard disk, network and interfaces; means for generating a vulnerability fixed message each time one of the vulnerabilities on the list of vulnerabilities has been fixed, the vulnerability fixed messages including the associated vulnerability ID for each fixed vulnerability; means for generating a list vulnerabilities message requesting a listing of all current client system vulnerabilities by associated vulnerability ID; means for generating a list of current vulnerabilities message in response to the list vulnerabilities message; means for storing details from the profile message, one or more health messages and one or more vulnerability fixed messages; means for accessing the stored details; and means for applying a set of scoring rules to the accessed details to determine an objective score for a client system administrator that is indicative of the client system administrator's ability to defend the client system against vulnerabilities.

In another embodiment of the present invention, a process for scoring a client system defense training exercise implemented over a client-server architecture is described. The process includes: sending a profile message by a first server to a client system including at least one computer, the profile message including a list of client system vulnerabilities with associated vulnerability identifiers (IDs); performing at least one of the following by an administrator of the client system: identifying client system vulnerabilities; exploiting client system vulnerabilities; fixing exploited client system vulnerabilities; generating a vulnerability fixed message by the administrator and sending to the first server each time one of the vulnerabilities on the list of vulnerabilities has been fixed, the vulnerability fixed messages including the associated vulnerability ID for each fixed vulnerability; sending a list vulnerabilities message by the first server to the client system, requesting a listing of all current client system vulnerabilities by associated vulnerability ID; sending a list of current vulnerabilities message by the client system to the first server in response to the list vulnerabilities message from the first server; storing details from the profile message, one or more vulnerability fixed messages, and one or more list of current vulnerabilities messages in at least one database associated with the first server; accessing the details stored in the at least one database by a second server; and applying a set of scoring rules to the accessed details by the second server to determine an objective score for the administrator that is indicative of the administrator's ability to identify, exploit or fix client system vulnerabilities.

BRIEF DESCRIPTION OF THE FIGURES

Each figure is exemplary of the characteristics and relationships described thereon in accordance with embodiments of the present invention.

FIG. 20 illustrates a client generated metadata message in accordance with the communication protocol of the present invention.

FIGS. 21*a* and 21*b* illustrate an acknowledge (ACK) state in accordance with the communication protocol of the present invention.

FIG. 21*c* illustrates a client generated acknowledge (ACK) message in accordance with the communication protocol of the present invention.

FIGS. 22*a* and 22*b* illustrate a VERSION state in accordance with the communication protocol of the present invention.

FIG. 22*c* illustrates a client generated VERSION message in accordance with the communication protocol of the present invention.

FIG. 23*b* illustrates a client generated REGISTER message in accordance with the communication protocol of the present invention.

FIG. 24 illustrates a client generated SID message in accordance with the communication protocol of the present invention.

FIG. 30 illustrates a client generated VULNFIXED message in accordance with the communication protocol of the present invention.

FIG. 32 illustrates a server generated VERSION message in accordance with the communication protocol of the present invention.

FIG. 33 illustrates a server generated ACK message in accordance with the communication protocol of the present invention.

FIG. 35 illustrates a server generated PROFILE message in accordance with the communication protocol of the present invention.

FIG. 36 illustrates a server generated PASS CHECK message in accordance with the communication protocol of the present invention.

FIG. 37 illustrates a server generated THROTTLE message in accordance with the communication protocol of the present invention.

FIG. 38 illustrates a server generated GETPORTS message in accordance with the communication protocol of the present invention.

FIG. 39 illustrates a server generated GETVULNS message in accordance with the communication protocol of the present invention.

DETAILED DESCRIPTION OF THE INVENTION

Figure 1:
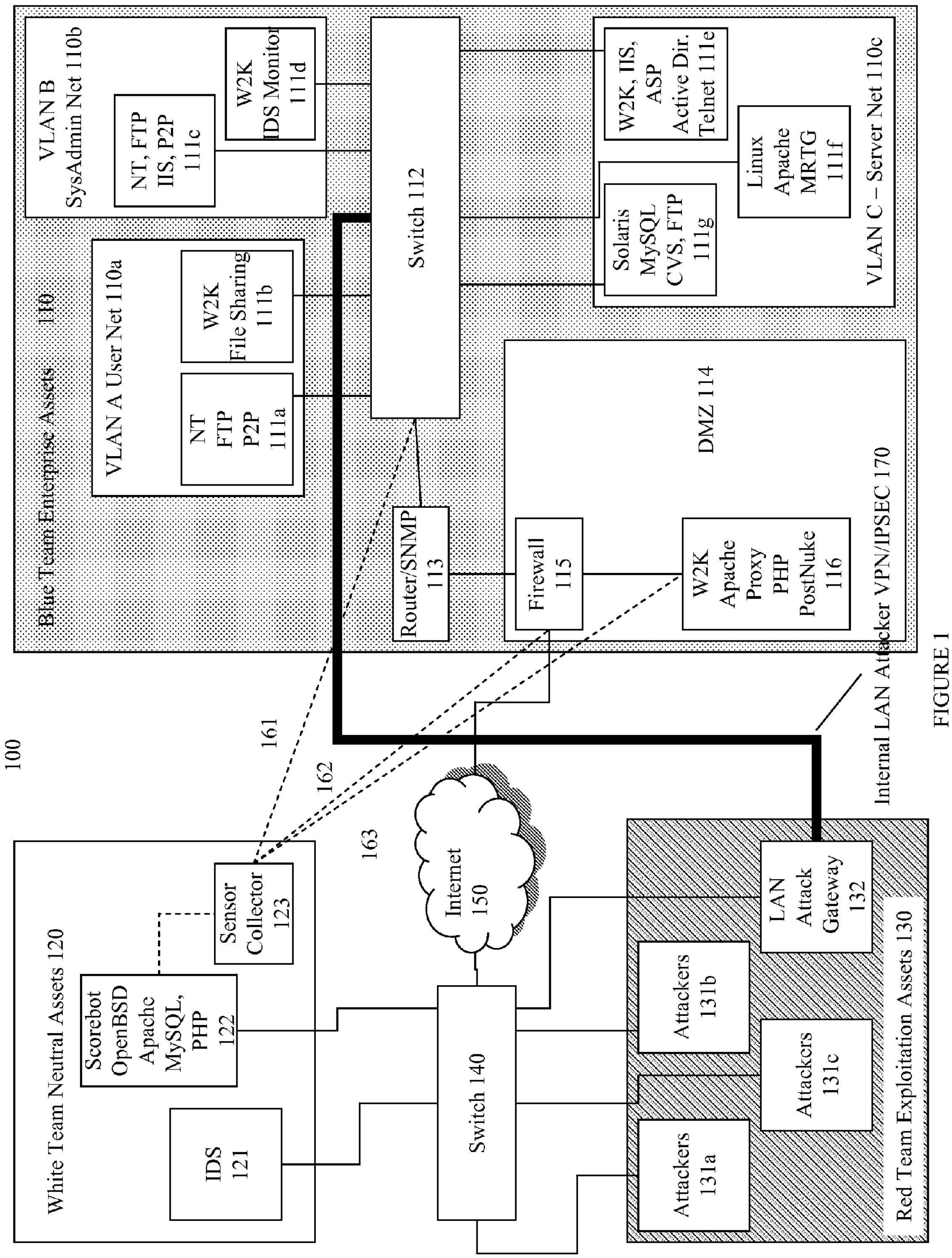
FIG. 1 is a block diagram illustrating relationships between elements of a system of the invention.

As required, detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention. While best mode is described, not all embodiments contain all features described herein. The individual features described herein relate to an exemplary composite of various embodiments of the invention.

There are many possible means for defending against threats to IT systems; whether such threats are launched by an insider or by a hacker in cyberspace. Existing approaches to training IT staff in defending against such threats do not often offer realistic exercise environments in which to train against live, re-configurable targets and networks. Typically no formalized and repeatable mechanism is provided to conduct routine exercises and quantitatively assess staff and network performance over time.

An effective means for protecting computer networks is to ensure that an enterprise's IT staff is armed with the technical skills and practical experience to recognize the indicators of, and defend against such threats. It would be beneficial that such training occur in an environment at least similar to the everyday operational environment encountered by the IT staff, and against threats likely to be encountered in the operational environment. In addition, it would be beneficial for the IT staff to learn to work as a team, administering and coordinating the many functions of computer network defense.

There are at least two obstacles to training a team on live data in an environment similar to their operating environment. First, the cost to send an entire IT staff off-site—either the direct cost, or the cost of not having sufficient IT staff on duty during training Second, running live exploit training on an operational network not only is risky due to potential service outages causes by training scenarios, but the enterprise also may experience reductions in network performance and responsiveness to customers.

Embodiments of the present invention train IT staff to, e.g.: identify vulnerabilities and lock down systems (e.g., networks, servers, and workstations); configure router policies; configure and monitor host-based and network-based IDS; recognize hacker/computer misuse activity; and properly respond to hacker/computer misuse. Each of these activities should be conducted in accordance with the enterprise's security policy.

Some embodiments of the invention are self-contained, e.g., they do not connect with customer's network. This approach mitigates disruption of customer operations while providing realistic training Systems of the invention can be configured to provide network architecture representative of the customer's IT infrastructure; for example, by using standard UNIX and Windows operating systems, network and security devices and software.

Real-world, live exploitation scenarios implemented by embodiments of the invention include exploit types such as: Simple Network Management Protocol (SNMP) shutdown via samba, Hypertext Transfer Protocol (HTTP) exploits and defacement; router reconfiguration; Secure Shell (SSH) exploits and shutdown; File Transfer Protocol (FTP) open traffic; Microsoft Windows® worm; and Hypertext Preprocessor (PHP) exploits. Some scenarios implement recognized vulnerabilities such as the 2003-2007 SysAdmin, Audit, Network, Security (SANS) Institute/Federal Bureau of Investigation (FBI) Top 20 List; common misconfigurations such as default accounts and passwords, and common vulnerabilities such as buffer overflows, race conditions, worms, and viruses. Some embodiments employ cyber attacks such as enumeration, discovery, and port scanning using Request For Change (RFC)-compliant Internet Control Message Protocol (ICMP) packets and Transmission Control Protocol (TCP) and User Datagram Protocol (UDP) connections. In preferred embodiments, the exploits are rendered relatively harmless. While services may be disabled by an exploit, the exploits are modified so that no unrecoverable or uncontrolled damage occurs. Further, exploits are updated to reflect current day vulnerabilities and documented attacks.

Beyond comprising one or more threat scenarios, each system exercise can include exercise controls such as rules of engagement (e.g., a list of what testing may/may not include, stop test procedures), exercise objectives, measures of performance, target configurations, and a communications plan. The exercises are configured to be repeatable, e.g., targets can be reset to an original state and exercise repeated—allowing meaningful comparison between results from one session to the next. Each exercise can train a plurality of trainees.

Embodiments of the invention allocate system assets to teams. FIG. 1 is a block diagram of a system of the present invention illustrating a set of relationships between assets. Other architectures and configurations are possible within options known to those skilled in the art.

A Blue Team comprises IT staff trainees and is allocated enterprise assets 110 to train on and to protect. For example, the Blue Team can be responsible for target systems and network defense; to review initial system configurations to verify that machines are properly configured and patched against vulnerabilities; to monitor and manage network and host-based systems using intrusion detection systems (IDS) and forensic inspection as necessary; to monitor and manage network and host-based systems to thwart active threats; and to report computer misuse to operational staff.

For the Blue Team, network priorities are availability and security. Network services should be maintained operational, in accordance with the security policy; some services will be assigned higher priority according to the exercise scenario. In many embodiments, the Blue Team is not allowed to "hack back" to points outside of the firewall. Similarly, Blue Team members are not allowed to modify administrative users, e.g. White Team users. Internet Control Message Protocol (ICMP) pinging must be allowed within the internal network and to external devices, other than the firewall. Blue Team use of automated patching tools (i.e. Up2date, Windows "Automatic Updates" service, etc.) is not allowed in most embodiments except for identified client machines. Patches are provided by the trainers based on reasonable Trouble Ticket requests. In most embodiments, Blue Team members must follow the guidelines set forth in the appropriate organization network security policy for securing the enterprise assets 110.

A Red Team comprises trainers with exploitation assets 130 configured to exploit enterprise assets 110. The Red Team is responsible, for example, to simulate the hacker threat by attacking enterprise assets 110 (using methods such as deployment of malware that has been rendered substantially harmless), and to follow the sequence of events as prescribed by an Exercise Director, e.g., a White Team member.

A White Team comprises trainers with neutral assets 120 to control and score an exercise. In addition, White Team members are responsible for initial target system configuration and providing training and feedback during the exercise as appropriate, and at a debrief. The White Team monitors and responds to Trainee "Trouble Tickets", providing guidance and scoring the quality of the trouble ticket submitted by the trainee. The White Team is further responsible to ensure flow of exercise mirrors real-world operations as closely as possible.

Conventional network communications between Red, White, and Blue assets are through networking devices Switch 140 (and thru the Internet/Switch 150 for remote training) When configured for remote training, some embodiments of the present invention allow access from terminals on an operational network (e.g., the client's network), but access to the assets of the operational network is prohibited, e.g. creating a virtual private network for assets of embodiments of the invention. Secondary communications for the White Team to gather scoring data are through ports and probes 161, 162, 163. For example, port and probe 161 are mirrored ports and a probe on the internal network side of the Router 113. Probe 162 is connected to the external side of the firewall 115 while probe 163 examines network assets in the "demilitarized zone" (DMZ). In some embodiments, the Red Team is given a dedicated attack path 170 to the enterprise assets that typically would not exist in the customer's actual network. In other embodiments, the Red Team has physical access to the Blue Team assets, e.g., switch 112.

In many embodiments, enterprise assets 110 include network devices such as routers, switches, etc., security devices (firewalls, IDS, etc.), servers (Windows NT/2000, Linux and Solaris); workstations (Windows NT/2000), and a system administrator web server 111*c* with software and explanations to properly configure enterprise assets 110. In many embodiments, one system 111*d* on the SysAdmin Net is dedicated and manned to monitor the IDS and System Status Board—described below.

In addition to a DMZ 114, router 113, and switch 112, in FIG. 1 enterprise assets 110 comprise a series of logically grouped hosts (referred to herein as "VLAN") VLAN A 110*a*, VLAN B 110*b*, and VLAN C 110*c*. Grouping in this fashion provides administrative separation between network cells as though they were physically separate switches. A DMZ is a portion of a network area that sits between an enterprise's internal network and an external network. It allows hosts within the DMZ to provide services to the external network, while protecting the internal network. In FIG. 1, a DMZ host 116 is running Microsoft Windows® 2000 (W2K) operating system, Apache web server, a proxy server, and server applications in open source PHP and PostNuke environments. In other configurations, enterprise assets can include other types of network devices and data terminal equipment know in the art, e.g., bridges, gateways, hubs, modems, multiplexers, etc. The enterprise network can be configured to reflect the makeup of a customer's enterprise network. As new operating systems emerge, they will be included as new virtual targets.

Each VLAN comprises hosts 111*a*-111*g* running a variety of operating systems such as Microsoft Windows® 2000, Windows NT, Solaris, and Linux; along with a variety of applications such as file transfer under the File Transfer Protocol (FTP), file sharing, database management (e.g., MySQL), web servers and extensions (Apache, IIS, ASP), a software development configuration management system (CVS), portions of an intrusion detection system (IDS), a Multi-Router Traffic Grapher (MRTG) network utility, terminal emulation software (Telnet), and directory services (Active Dir.).

Figure 2:
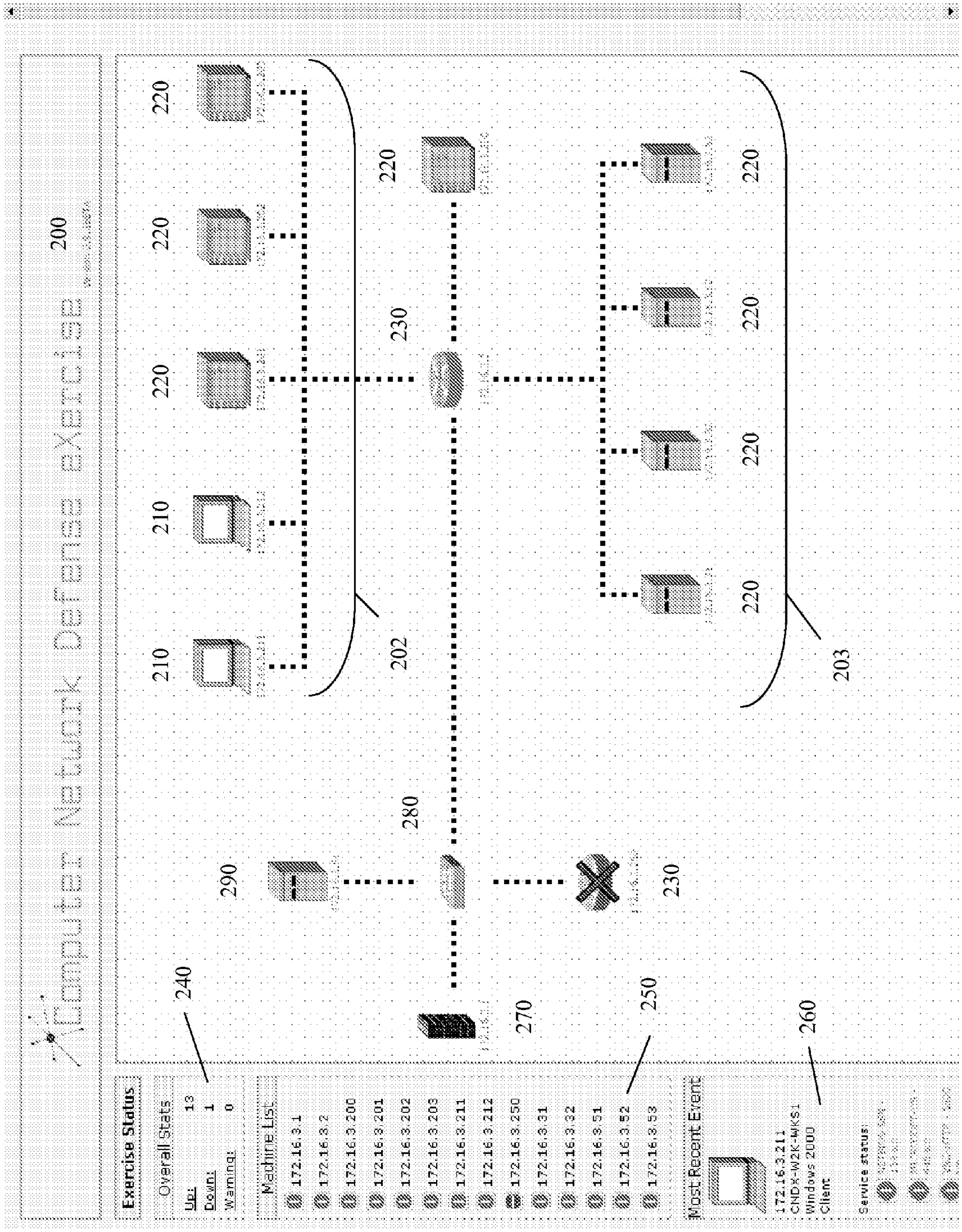
FIG. 2 illustrates a nominal "Network Management Console" interface depiction of the status of exercise resources.

Referring to FIG. 2, an interactive exercise status window for enterprise assets is shown. A firewall 270 is shown controlling access to external networks. A hub 280 connects the firewall 270 to a router 230 (shown as "down" by the "X" across the router icon), a server 290 configured as a DMZ host, and a router 232. The router 232 serves two VLANs 202, 203, and a standalone server 220. VLAN 202 comprises workstations 210 and Servers 220. VLAN 203 comprises a series of servers 220.

In addition to displaying up/down/warning status graphically, e.g., "down" corresponding to an "X" displayed over the network device icon, "warning" corresponding to an exclamation point "!" being displayed over the icon, summaries of overall status 240, machine status 250, and most recent (including service status for monitored services) 260 is shown in the left portion of the screen. For the display of FIG. 2, status for fourteen network devices (the hub is unaddressed) is shown as "Overall Stats" 240. The Machine List 250 confirms this status by showing router 172.16.250 as down by displaying a horizontal bar next to its address; up devices display a vertical bar adjacent to the address.

Figure 3:
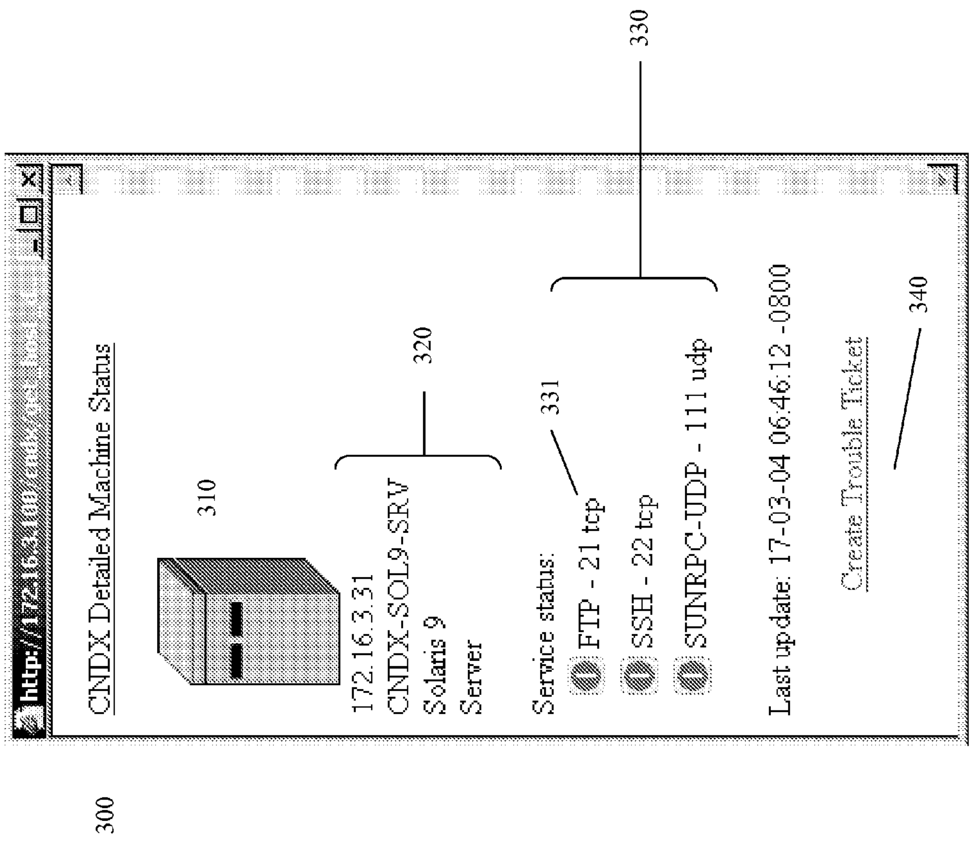
FIG. 3 illustrates a detailed machine status snapshot window.
Figure 4:
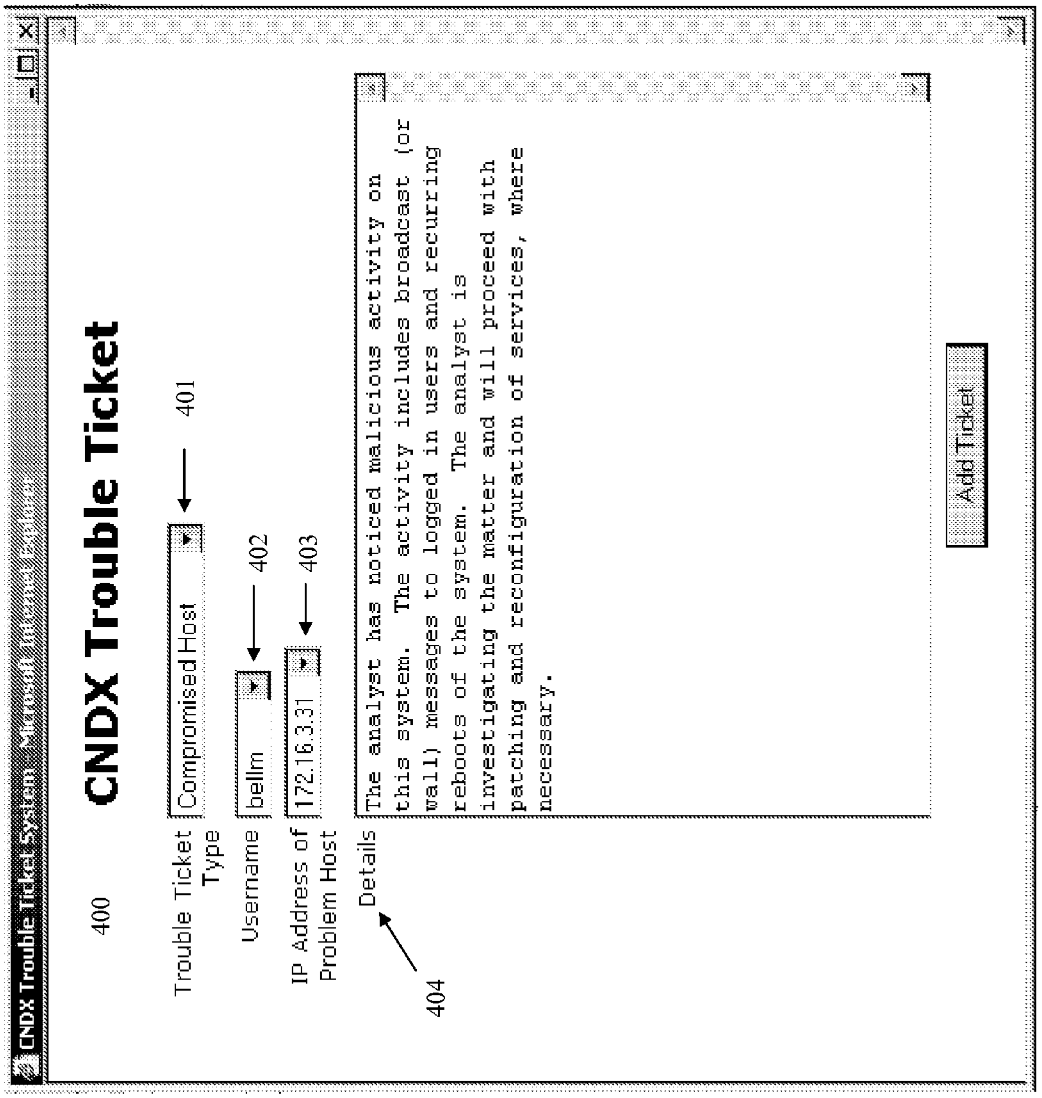
FIG. 4 illustrates a "student's" trouble ticket creation window.

By clicking on a specific node on the screen, or on the list of nodes on the left hand side of the screen, the trainee can get more in depth information about the node (see FIG. 3). If changes are made to the host or a problem is noticed, the trainee can select "Create Trouble Ticket" to report the problem (FIG. 4).

Figure 12:
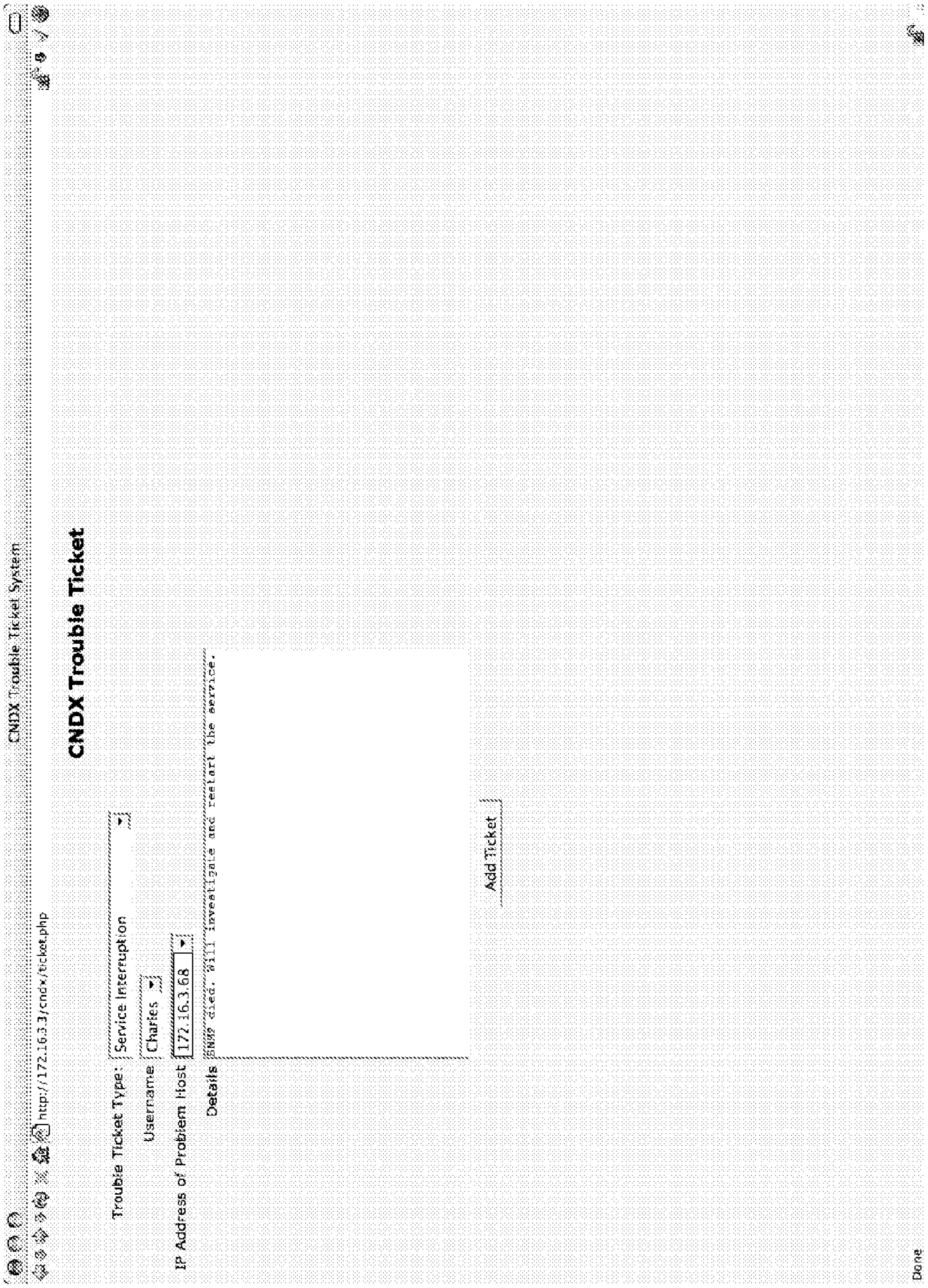
FIG. 12 illustrates a "student's" trouble ticket creation window.

Referring to FIG. 3, a detailed machine status window 300 of the current invention is illustrated. The window 300 describes the status of a node identified by its icon 310, its label 320 (including IP address, machine name, operating system, and role). In addition, the status of services monitored by embodiments of the invention 330 is also shown, e.g., in FIG. 3 file transfer (FTP) service 331 is shown as available. A link 340 near the bottom of the window 300 leads to the trouble ticket window 400 illustrated in FIG. 4 listing fields for Trouble Ticket Type 401, Username 402, IP Address of Problem Host 403 and Details 404. A second exemplary trouble ticket screen is illustrated in FIG. 12.

Referring again to FIG. 1, exploitation assets 130 available to the Red Team include at least one host 131*a*-131*c* configured to launch exploits against the enterprise assets and a host configured as a local area network (LAN) attack gateway 132. Both attackers 131 and the LAN attack gateway 132 have conventional access to the enterprise assets via switch 140, Internet 150, and the enterprise firewall 115. The LAN attack gateway also has access to all hosts visible on the enterprise network 110 via the enterprise network switch 112, thereby bypassing the firewall.

Neutral assets 120 include one or more hosts 121, 122, 123 running on the open source OpenBSD operating system. OpenBSD is a multi-platform BSD-based UNIX-like operating system with special features for security. Applications for controlling and scoring the exercises are run on this host, including an application that uses the Apache Web Server and Php Server to display the current statistics for the Blue Team, storing the data in the MySQL database with web interfaces for the teams to for scoring, status, and trouble tickets. In some embodiments, the IDS is deployed as a Blue Team asset and is an available target that can be attacked by the Red Team. The Sensor Collector can be implemented as a process within the scoring process.

Neutral assets include computer program products for controlling and scoring system exercises. In some embodiments, a Controller Perl Script reads a list of Target IP addresses provided by the Exercise Coordinator at start up, and pulls relevant Target information from the backend target database running on MySQL. Target information includes critical services and vulnerabilities for each host as well as relative point value.

The Controller creates Perl scripts on-the-fly to test Target Platforms. In addition, the Controller executes Perl scripts that scan for scoring information. If a target host is alive, the target host is checked to see if specified services, e.g., critical services are available. In addition, the Controller tests targets for vulnerabilities. Scores are collected in the neutral asset MySQL database for target dead/alive, service up/down, and vulnerabilities found. A scoring Perl script reads scan results from the MySQL database and calculates scores (group—e.g., Windows, UNIX, etc.; and individual). The script displays scores in graphical format via a system http: site to show how well the network defense team (Blue team) performs over time.

Figure 8:
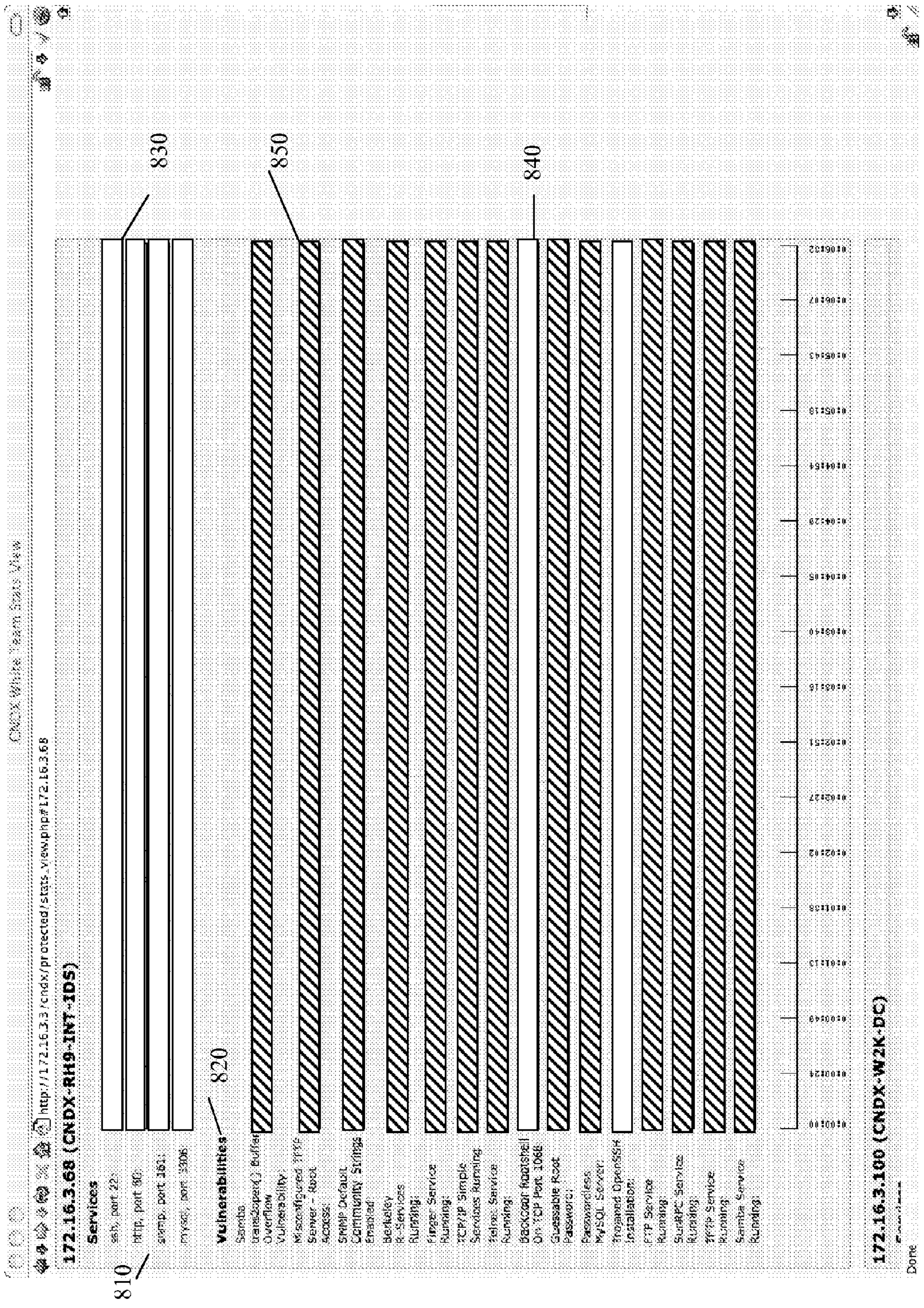
FIG. 8 illustrates a services and vulnerabilities timeline.

Embodiments of the invention keep track of the Blue Team's progress by monitoring the target systems and services to determine if any services or systems are not operational and whether any vulnerabilities exist. This information is displayed in a time-based graphical form as shown in FIG. 8. With reference to FIG. 8, services 810 and vulnerabilities 820 appear on screen to the user as either black (the resource/platform for the service is not available; or vulnerability status is indeterminable), red (the resource/platform for the service is available, but the service is down; or vulnerability is valid), or green (the service is available; or the vulnerability is mitigated). The colors indicating red and green are shown as cross-hatch (red) and white (green) respectively in the figures of the present application. This display may also be monitored by the Red Team as one basis to determine which attacks to perform. Alternatively, for repeatable exercises, the Red Team disregards vulnerability status and launches exploits at prescribed times. It should be noted that embodiments of the invention can report total system performance as well as by either system types (i.e. UNIX, Windows, Security and Network Devices), and by each individual system.

Trainees are evaluated in two ways in some embodiments: quantitatively and qualitatively. These methods will apply both objective (automated scoring) and subjective (evaluator scoring) scoring criteria to help the trainees to evaluate their strengths and weaknesses in defending enterprise assets. Quantitative factors include: time from initiation/start of exploit to time detected; time from exploit detection to time corrected; effective triage according to priority of service; percentage of exploits detected; percentage of exploits corrected; mean/median time for exploit detection; mean/median time for exploit correction; and mean/median number of services down. Qualitative factors include: ability to effectively report incidents; apparent understanding of impact of downed services; apparent knowledge of student to detect and fix vulnerabilities; apparent knowledge of student to use detection/monitoring systems. Qualitative values are converted to quantitative values (minus 10 to plus 10 scale) via the White Team Trouble Ticketing interface.

Figure 5:
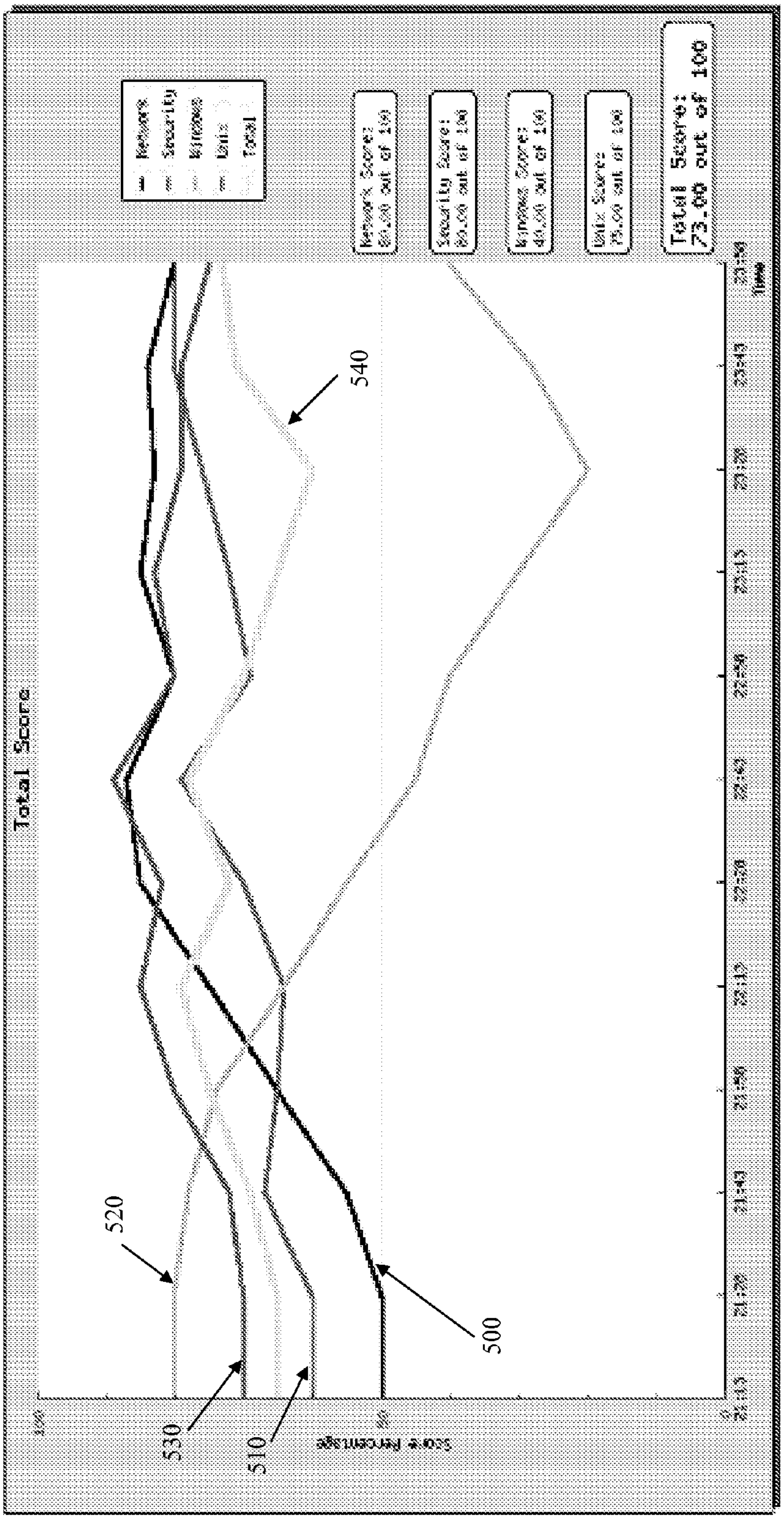
FIG. 5 illustrates a scoring timeline.

FIG. 5 depicts an exemplary score over time based on the above mentioned factors, showing components for Network status 500, network security 510, operating system status (both Windows 520 and UNIX 530), along with a total score 540.

In all embodiments, the scoring software 122 provides real-time feedback of student's progress by measuring: system configuration data, system vulnerability data, student response to incidents; and vulnerability exploit results. In all embodiments, the measurements are taken every 45-60 seconds with results stored in a back-end database; other measurement periodicity appropriate to the training environment and operational environment can be used.

Scoring data is used during exercise by White Team to identify weaknesses in performance and then adapt, in situ, training in response. Scoring measures the ability of network defenders to: maintain critical systems and services (availability); detect and mitigate vulnerabilities, react to threats (i.e., hackers, abusers, etc.), and communicate with White Cell members for support and to report status of Blue Team resources and actions.

Some measures of performance that can be used include: time to detect system vulnerabilities; time to detect exploit from exploit initiation; time to correct exploit from exploit detection; time to complete incident handling; percentage of exploits detected and correctly diagnosed; percentage of exploits corrected; and percentage of services impacted. Performance Criteria include the ability to: lock down hosts; properly configure network devices; maintain network devices; detect computer misuse; correct misuse in timely manner; and work as a team. Qualitative aspects are translated to quantitative points, and thereby also contribute to the assessment of Blue Team performance.

Scoring and evaluation is implemented in real time as a computer program product across a plurality of platforms. It provides for automated analysis of man and machine, tracks multiple values over time, permits trend analysis, and allows evaluation against best practices. In some embodiments, exploits are launched from Red Team platforms. In other embodiments, exploits may be launched by Blue Team platforms if the games include offensive operations.

In a physical implementation of architecture such as the one described above, hosts may be implemented on blade or 1U multi-processor servers mounted in roll-away 21U chassis. These servers are housing for individual minimally-packaged hosts, switches, routers, and other network devices ("blades") that typically provide their own processors, memory, storage, and network connections, but share common cooling and a power supply built into the chassis.

The enterprise asset firewall 115 is a Cisco PIX 515 firewall, and the enterprise switch is a Cisco 24-port switch. Blades, switches, routers, and other network assets for all teams, along with integrated power filtration, are installed in man-portable chassis, e.g., roll-away 21U sized chassis, for deployment at a customer's site. As new technology emerges, updates to these systems performing standard network and security functions will be implemented.

In some methods of use of the invention, three phases of training are used. Prior to Phase I, the system topology is configured in a manner as described above by example; exercise controls and teams are established. In Phase I, instructors cover proactive measures for protecting a network, e.g., "best practices" for identification and mitigation of system vulnerabilities, installation and verification of security patches, identification and eradication of "back doors"; configuration of security devices such as firewalls, routers, and switches; and installation and configuration of intrusion detection systems.

In Phase II, various aspects of live exploits are described, such as the effect of the exploit, protection from the exploit, detection of the exploit, assessment of damage from its presence, mitigation of further damage, and collection of evidence. The trainees are then allowed to assess the present Blue Team network, clean it, and implement proactive measures. An example syllabus for Phase I and Phase II includes: exercise overview, general security fundamentals, windows security, UNIX security, SANS Top 20 vulnerabilities, toolset overview, IDS and firewall configuration fundamentals, and basic IT forensics.

In Phase III, Red Team members run exploits against the system, scoring proceeds (e.g., as described above), and feedback is given to participants. In addition to exploits described above, security testing may include attempted logins using guessed and discovered account names and passwords; network sniffing, traffic monitoring, and traffic analysis; use of exploit code for leveraging discovered vulnerabilities; password cracking via capture and scanning of authentication databases; spoofing or deceiving servers regarding network traffic; and alteration of running system configuration. Feedback can take the form of what trainees reported versus actual, and a preferred timeline of responses to the scenario.

Figure 6:
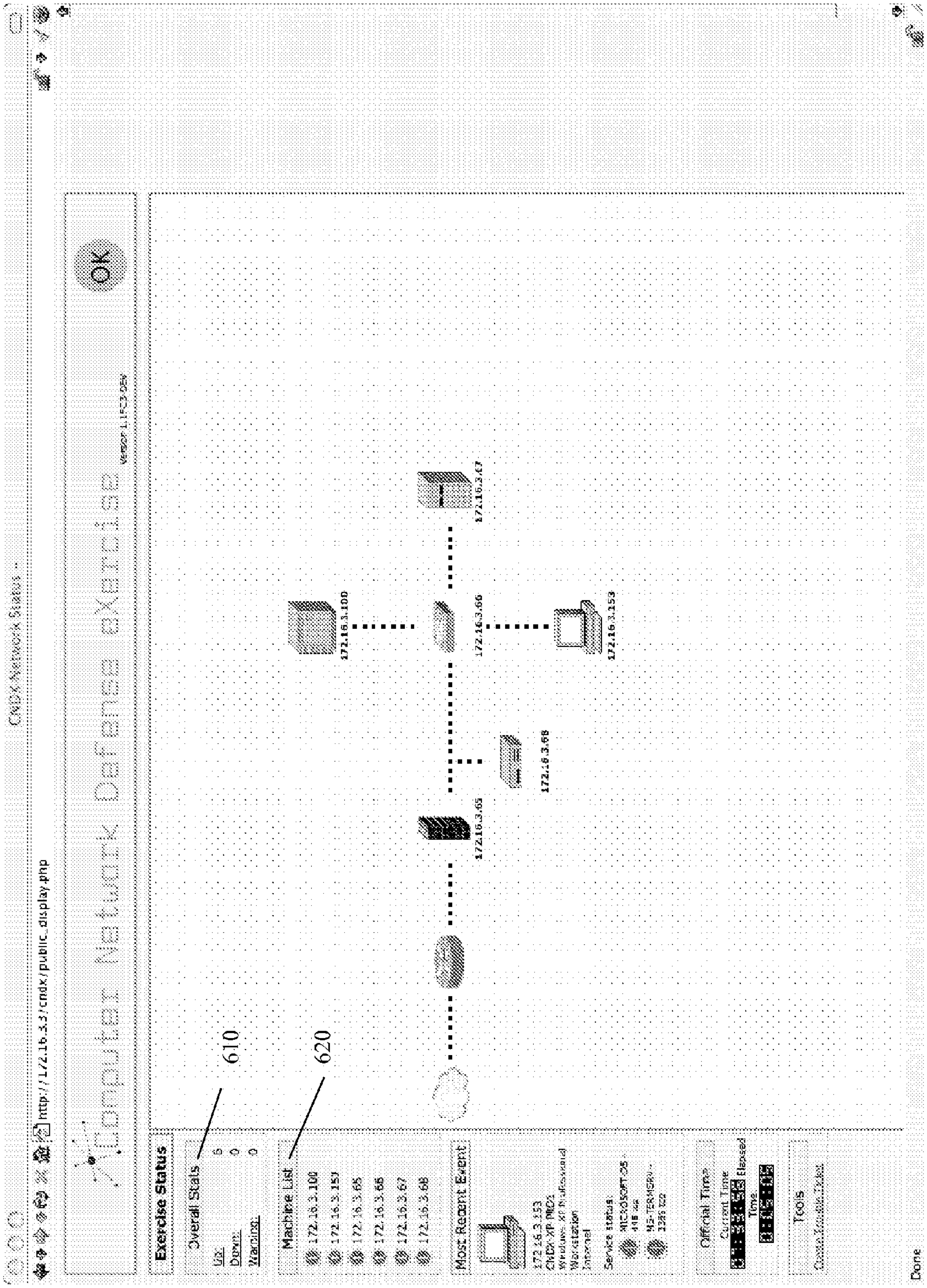
FIG. 6 illustrates a nominal "Network Management Console" interface depiction of the status of exercise resources.
Figure 7:
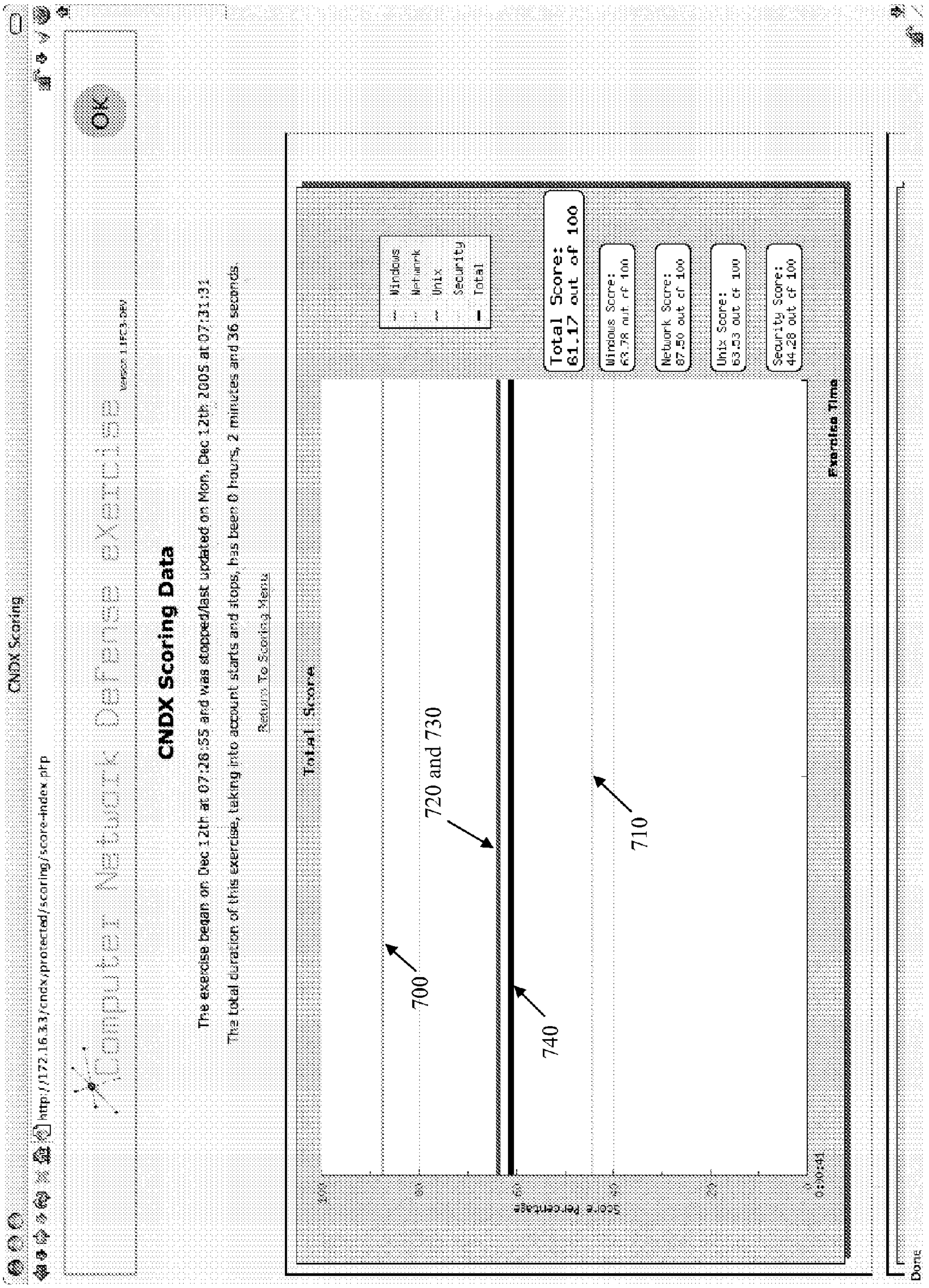
FIG. 7 illustrates a scoring timeline.

At the start of an exemplary simplified Phase III, Blue Team enterprise assets are quiescent, with no attacks being launched by the Red Team and no changes having been made from the initial configuration. Monitoring view for the Blue Team would look normal as shown in FIG. 6. Referring to FIG. 6, the overall stats 610 and the machine list 620 indicate that each IP address in the network is up. The scoring display (e.g., FIG. 7 as shown after the exercise was concluded) displays a constant value since no changes had been made: network status 700, network security 710, operating system status (both Windows 720 and UNIX 730 are overlapping as shown), along with a total score 740. FIG. 7 shows less than 100% at the beginning of the exercise because the systems are vulnerable to exploit at that point. A 100% score means that all vulnerabilities are fixed and all services are up/available. The per vulnerability view, by platform (in this case, 172.26.3.68 (CNDX-RH9-INT-IDS) (e.g., FIG. 8 also as shown after the exercise) shows no changes. In FIG. 8, available services and vulnerabilities that have been remediated are shown as white for purposes of the illustration, e.g., 830 and 840 respectively, though in an operational system of the present invention, the display color of green is preferred. Also in FIG. 8, existing and exploited vulnerabilities are shown as cross-hatch for purposes of the illustration, e.g. 850, though in an operational system of the present invention, the display color of red is preferred.

Figure 9:
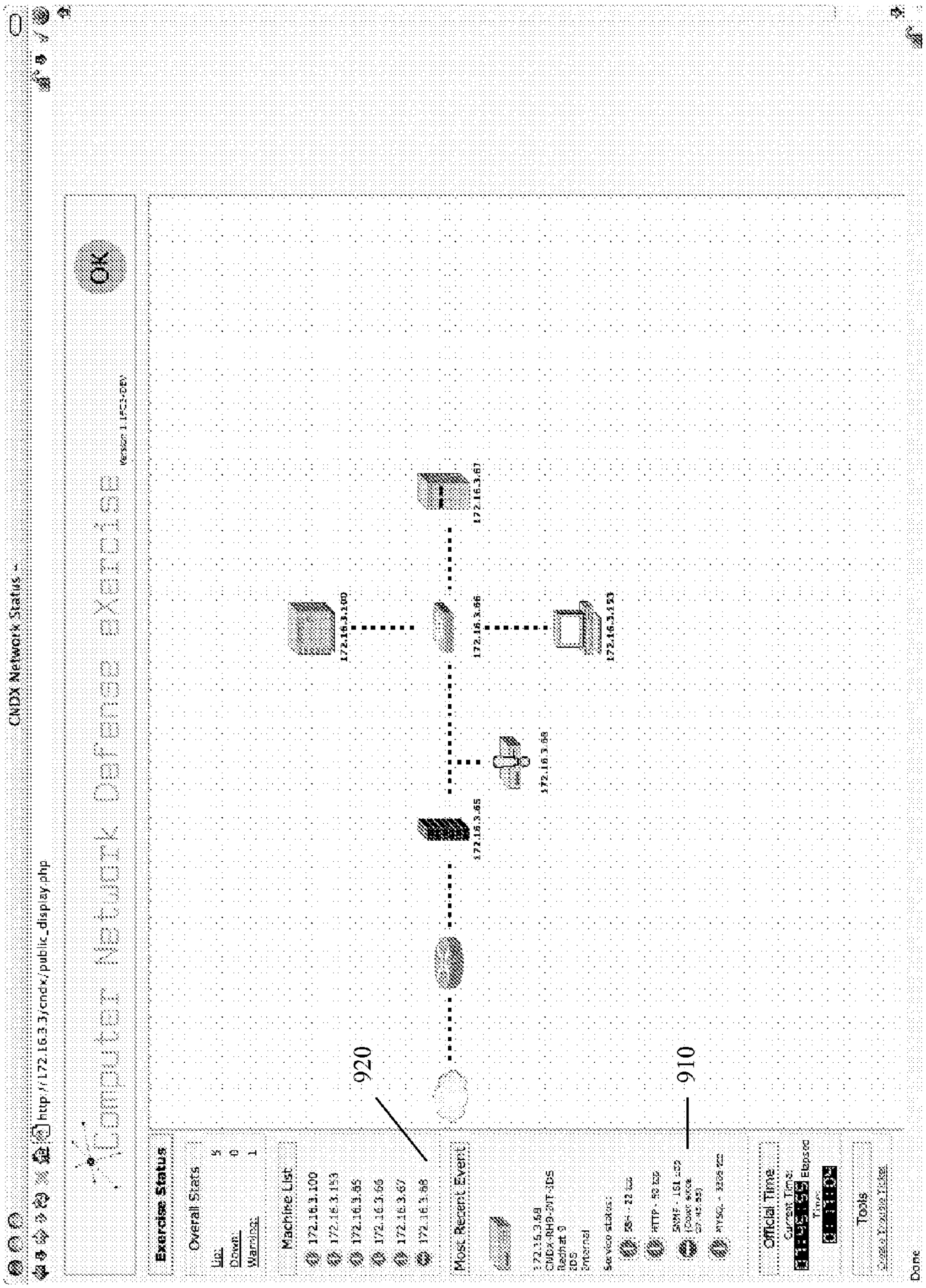
FIG. 9 illustrates a nominal "Network Management Console" interface depiction of the status of exercise resources.
Figure 10:
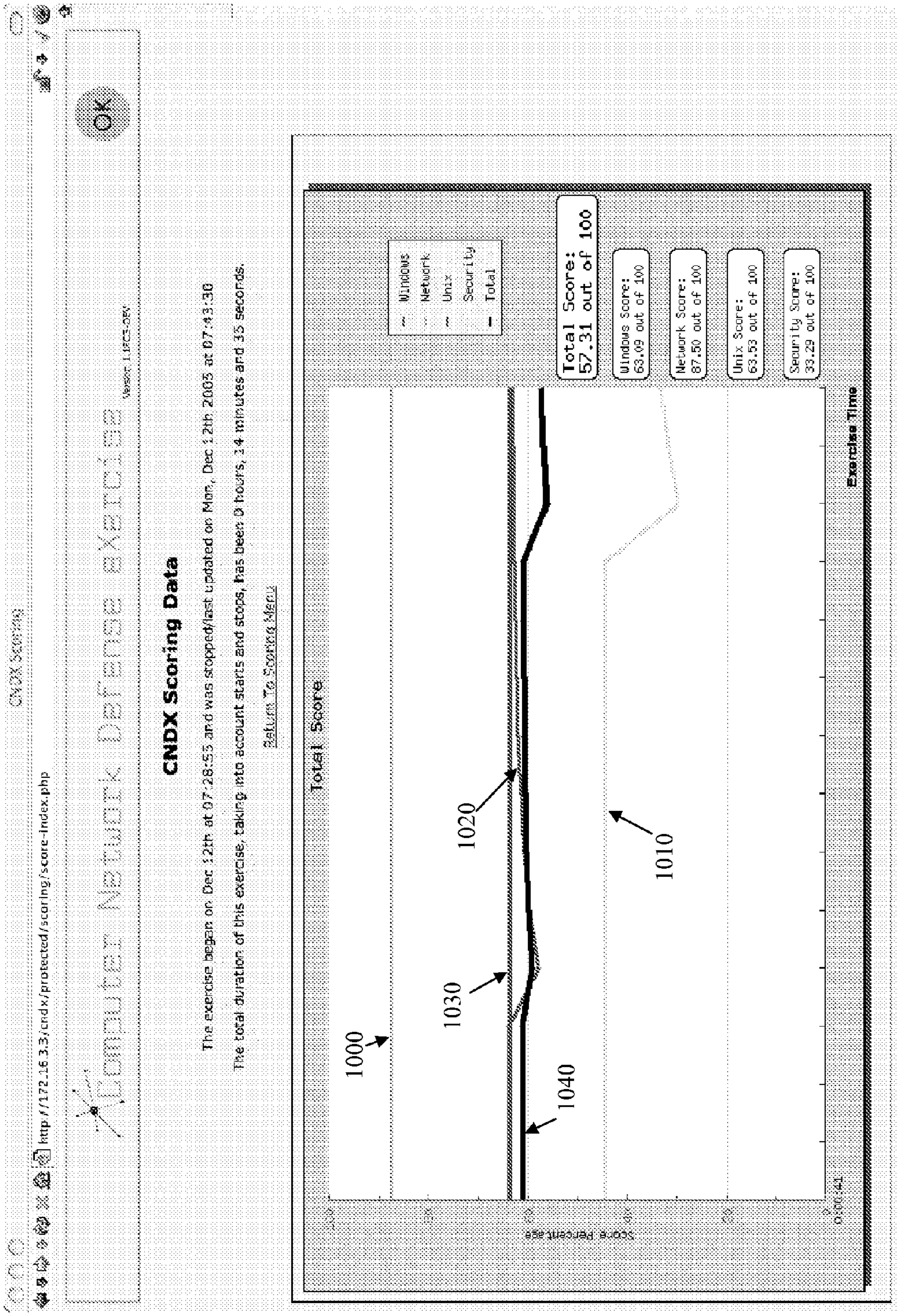
FIG. 10 illustrates a scoring timeline.
Figure 11:
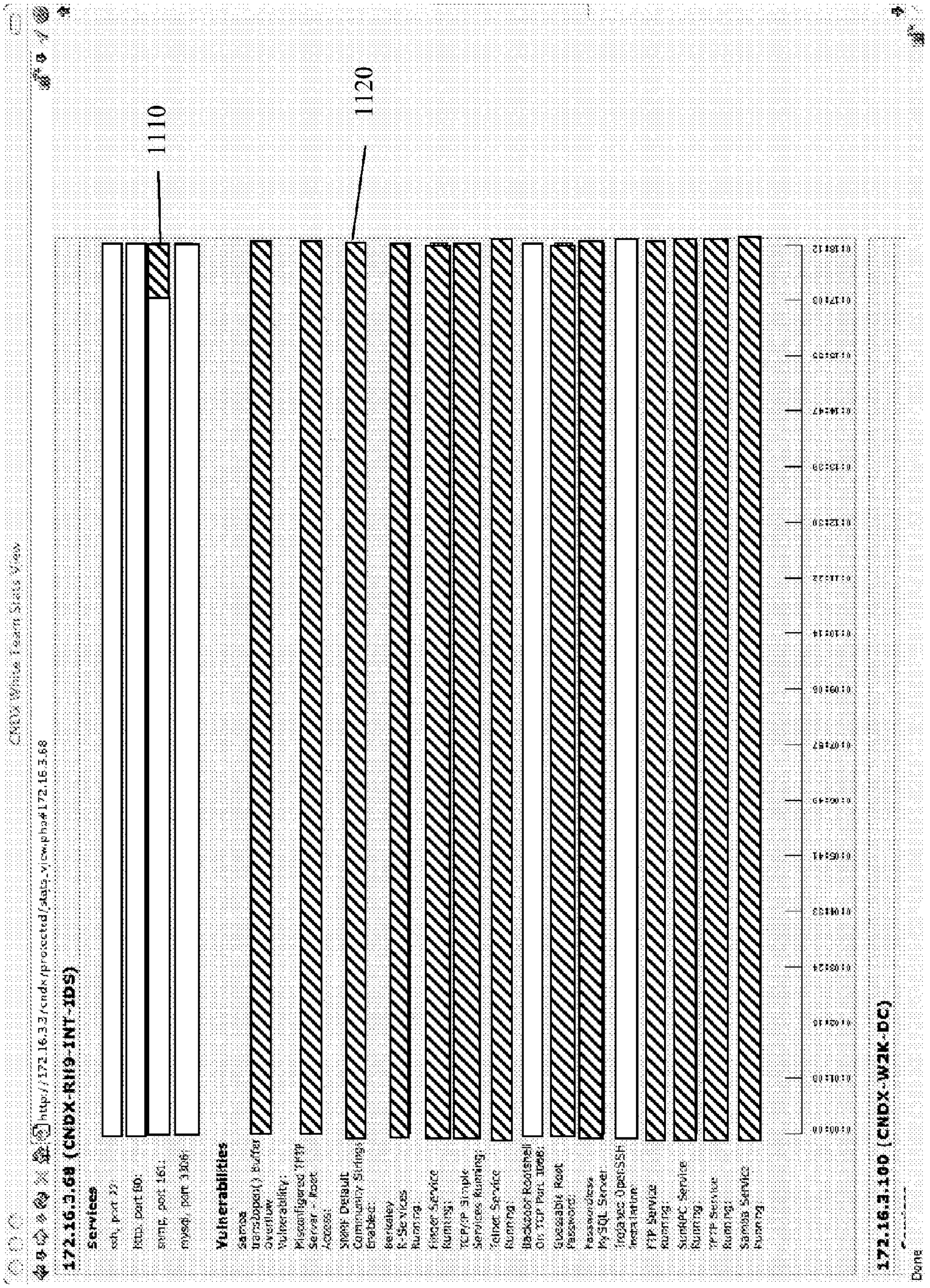
FIG. 11 illustrates a services and vulnerabilities timeline.

Upon the first launch of attacks by the Red Team, the attacker uses an attack script to gain control of a Blue Team host and disables one of the services. This action causes the monitor system, shown in FIG. 9, to display the loss of a critical service 910 and the status of the host 920, in addition to the flashing yellow explanation point symbol superimposed on the affected system. However since the attacker also successfully attacked the Blue Team host, the scoring system has deducted 10% of the current score as shown in the scoring display of FIG. 10: network status 1000, network security 1010, operating system status (both Windows 1020 and UNIX 1030), along with a total score 1040. The change in the service and vulnerability view, FIG. 11, showing a change to the "snmp, port 161" 1110 and to "SNMP Default Community Strings Enabled" for the time period 00:17:03 to 0:18:12 1120. The 10% change is reflected in the line graph going down by 10%. In preferred embodiments, the time axis of the scoring view and vulnerability view are both based on total exercise time elapsed.

Figure 13:
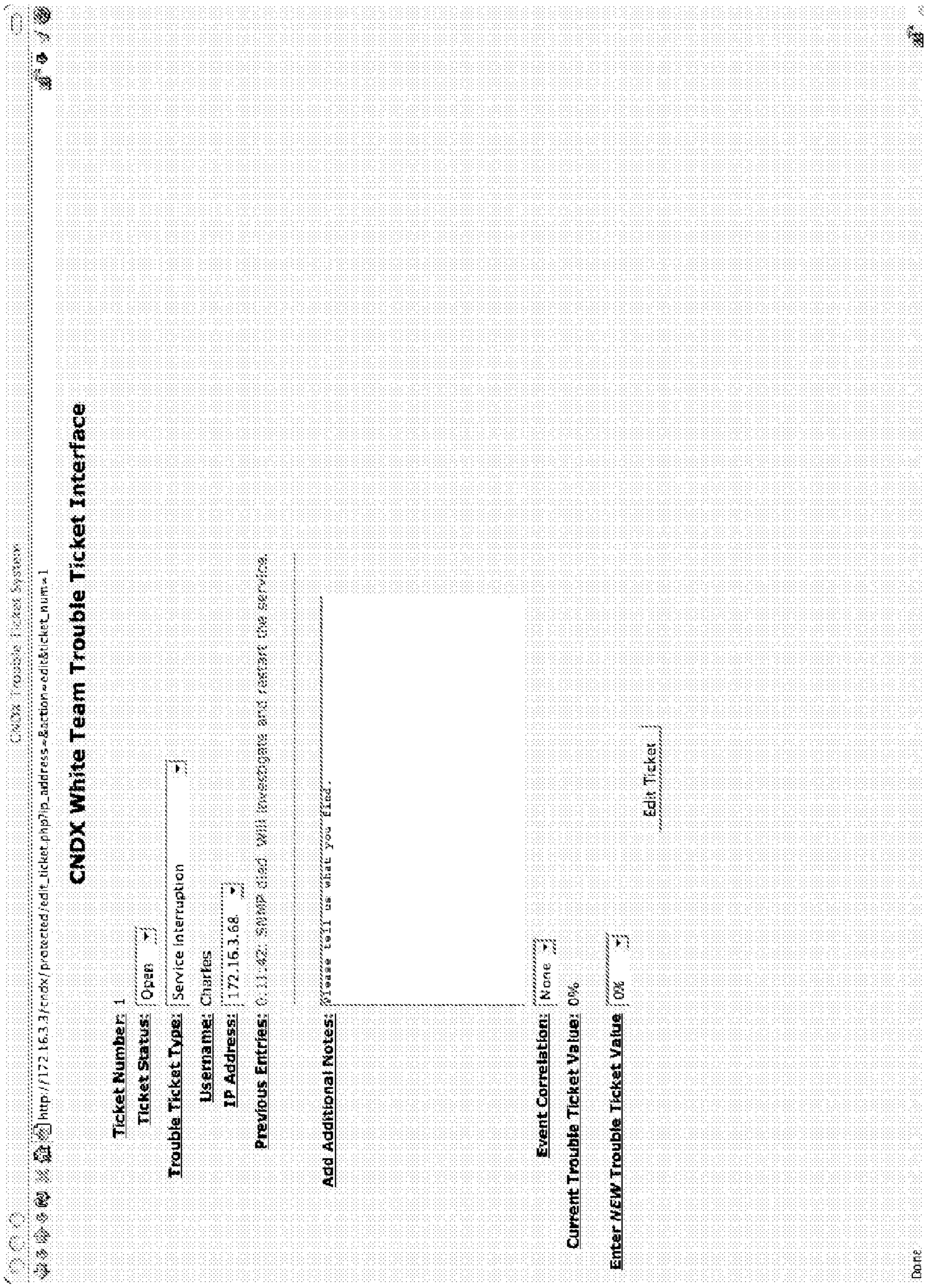
FIG. 13 illustrates a "white cell's" trouble ticket review window with scoring input pull-down menu.

Once the monitoring system informs the Blue Team of the loss of a critical service (or in the event that the Blue Team becomes otherwise aware of a trouble condition), the Blue Team puts in the trouble ticket, e.g., as shown in FIG. 12, to inform the White Team of the issue. The White Team then responds, e.g., as shown in FIG. 13, to direct the Blue Team to continue their progress with no change in scoring for the non-informational trouble ticket.

Figure 14:
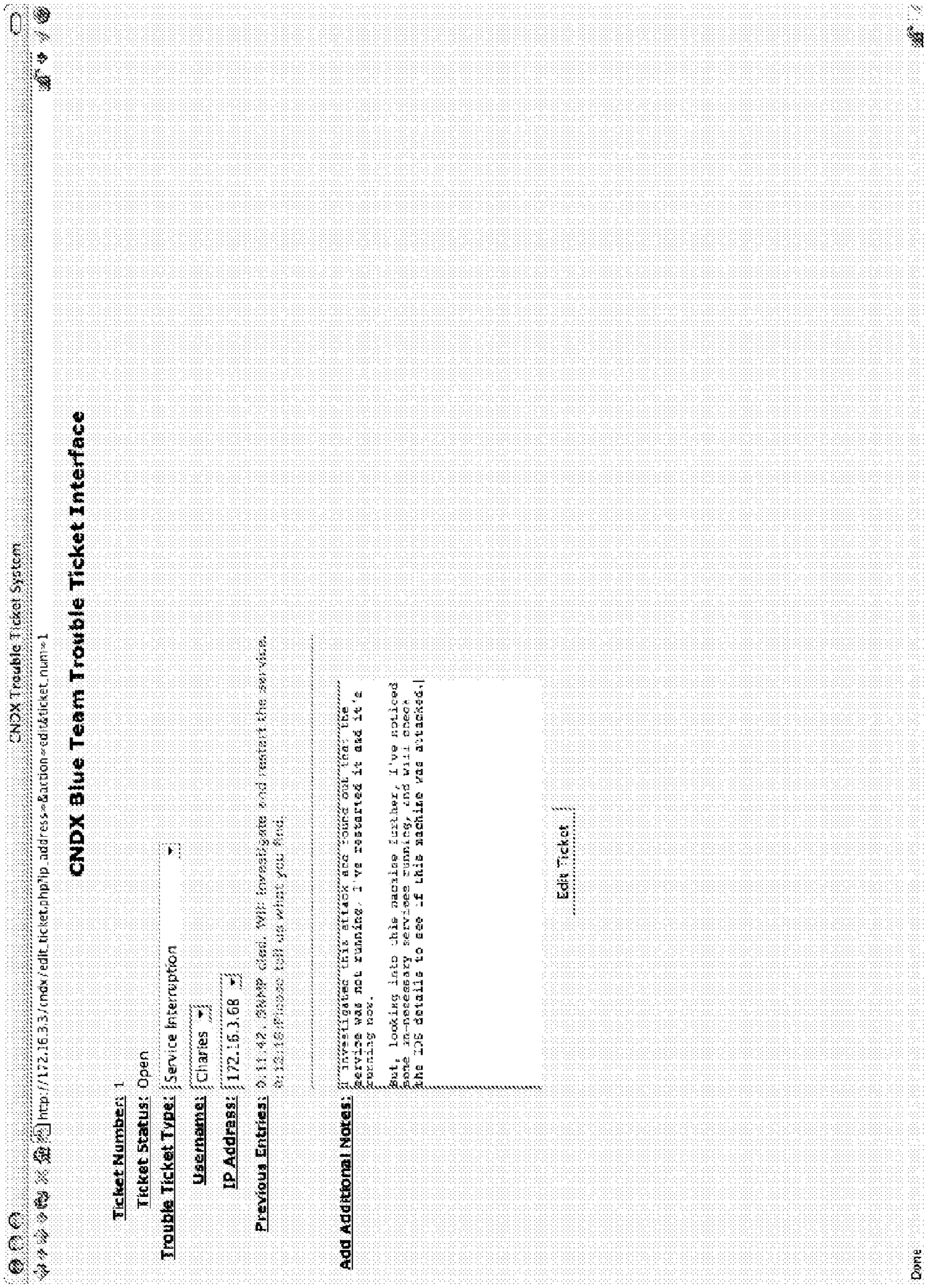
FIG. 14 illustrates an updated "student's" trouble ticket.
Figure 15:
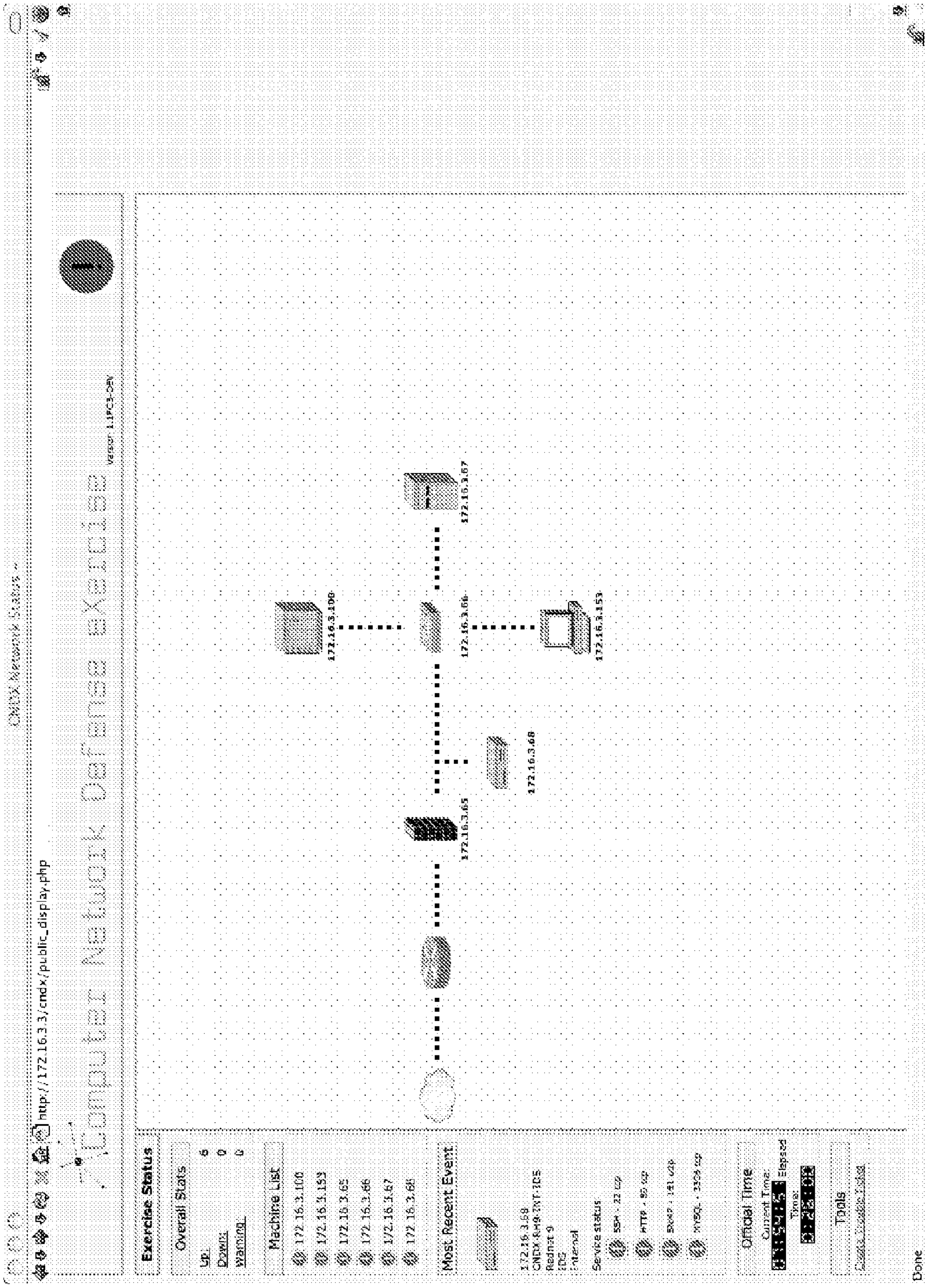
FIG. 15 illustrates a nominal "Network Management Console" interface depiction of the status of exercise resources.
Figure 16:
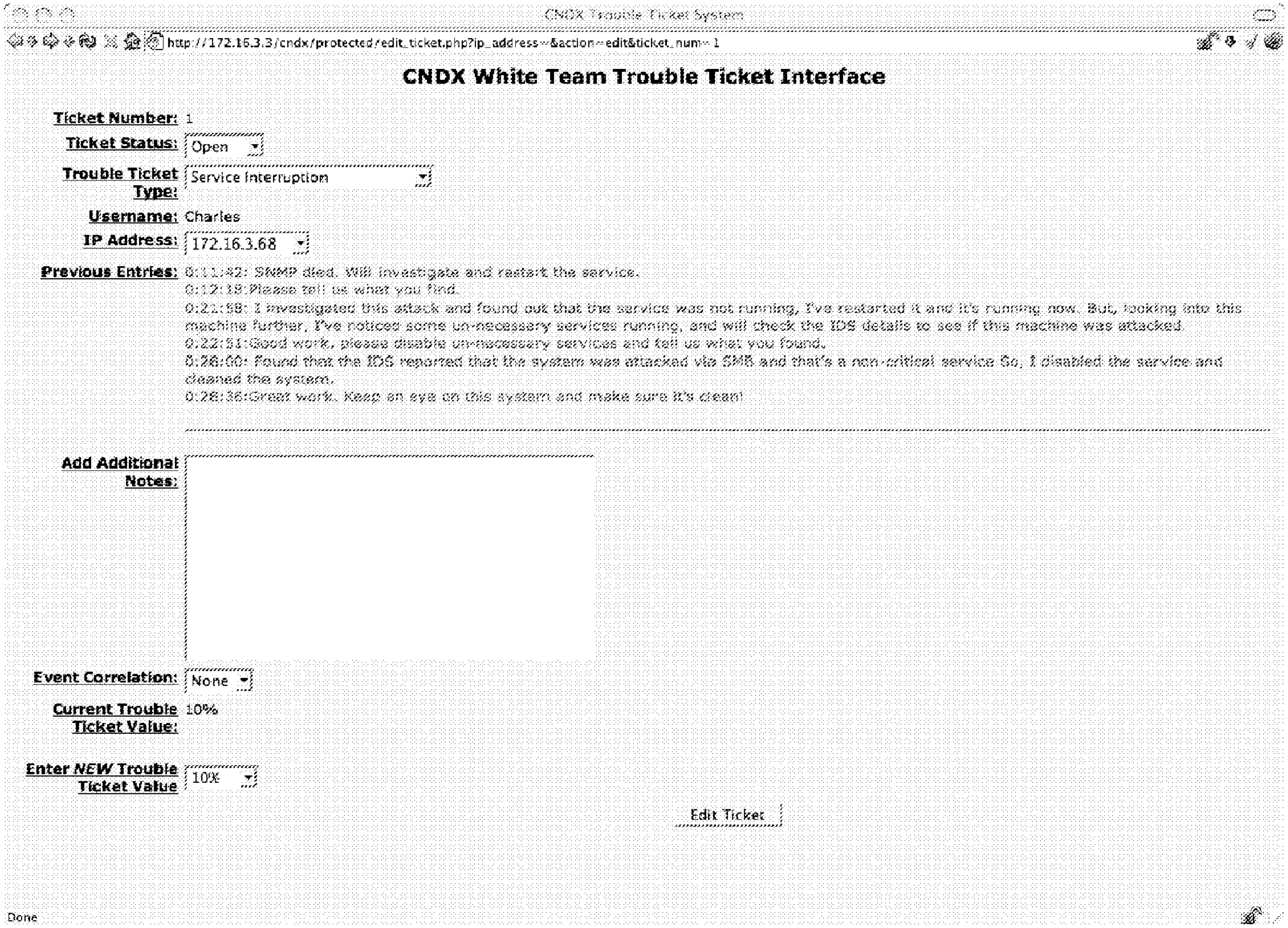
FIG. 16 illustrates an updated "white cell's" trouble ticket review window with scoring input pull-down menu.

Now the Blue Team is looking to restore their critical service and determine the cause of the problem. The Blue Team connects to the server, restarts the service and enters a trouble ticket, e.g., FIG. 14, to the White Team informing them of their current findings. Once the critical service is restarted, the monitoring view would return to it's previously "healthy" display, e.g., FIG. 15. The White Team responds, e.g., FIG. 16, to the trouble ticket and upon receiving the completed response from the Blue Team grants full credit of +10% for their trouble ticket response to the incident. As noted above, the White Team can assess a value between minus 10 to plus 10, for each separate incident of trouble ticket, depending on the timeliness and substance of the information provided.

After the scoring round is complete, the monitoring display shows that the system is back in a healthy state, where as the scoring display shows the changes due to the Red Team actions, the remediation by the Blue Team, and the scoring changes due to correct trouble ticket usage from the White Team. With the vulnerability view for this target displaying an improvement of the specific vulnerabilities fixes by the Blue Team during the remediation of this host.

In the embodiment described to this point, testing for vulnerabilities was accomplished by launching, on a 60 second interval, a sequence of associated exploits by the scoring system. If the exploit was successful, then the vulnerability was considered still valid; if however, there was no return value from the target system, then the vulnerability was considered to be mitigated. In an embodiment of the present invention, team-based network monitoring exercises are staged, run and scored via a client-server infrastructure with a web-based front end and preferred communication protocol. The infrastructure supports rule-based configuration of clients; end-to-end communications between server and client and simple interface for delivery of scenarios. The server provides at least the following functionality: provides the client with a set of profiles, e.g., aggregated rules, to establish a target which the client monitors for vulnerabilities; introduces vulnerability scenarios into the target and manages the reset and termination of the scenarios; tracks client identification of such vulnerabilities and the handling thereof; and provides a scoring system to grade the client's response to the vulnerabilities. The target can either be a virtual machine (using VMWare) or it can be a physical hardware device.

Figure 17:
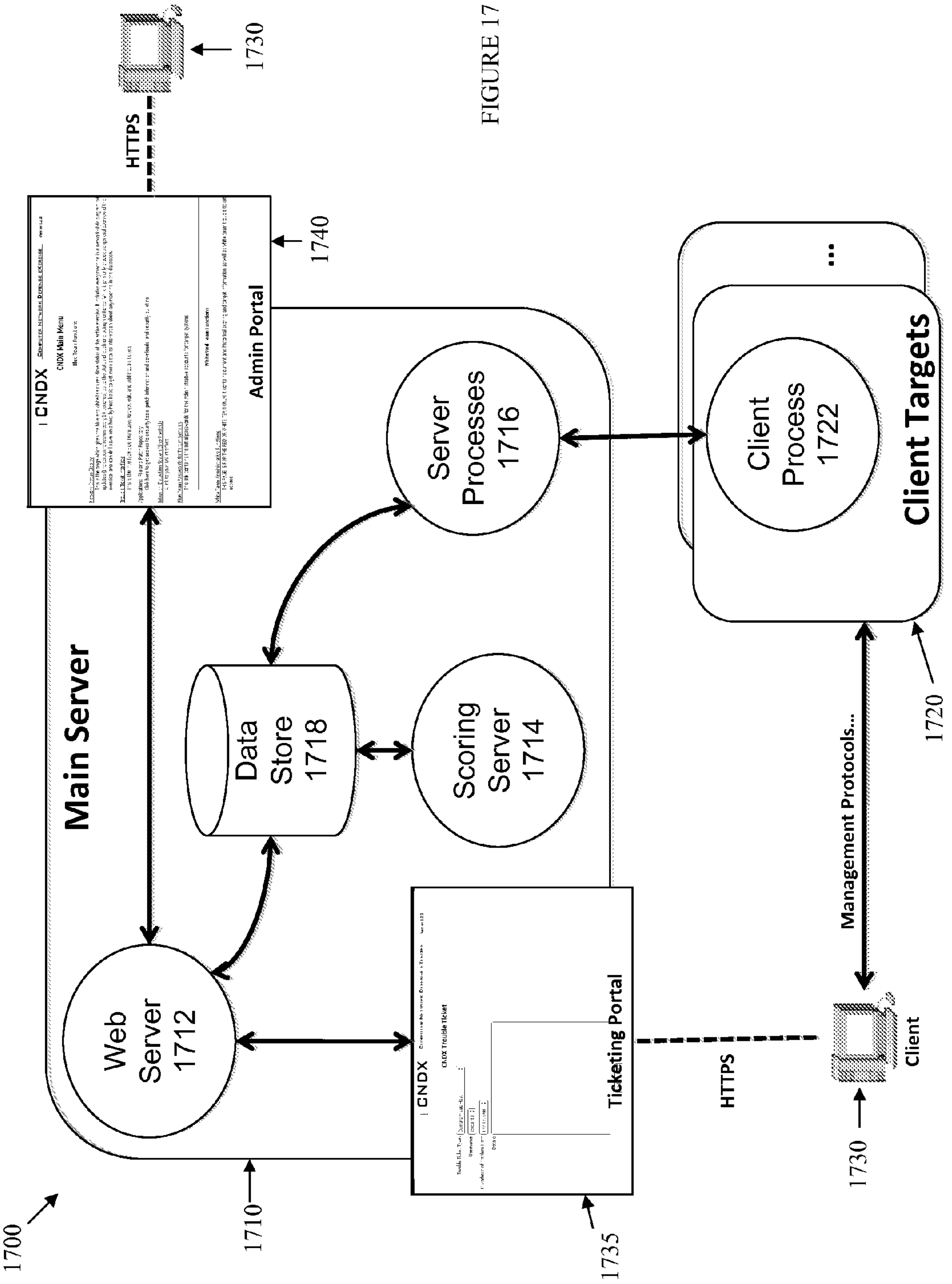
FIG. 17 illustrates a client-server process architecture.

Referring to FIG. 17, the primary components of the client-server architecture 1700 include: main server 1710, which further includes, facilitates and manages web server 1712, scoring server 1714, server processes 1716, data store 1718; and client target 1720 which includes client processes 1722. Users access and interact with the infrastructure through work stations 1730 and web portals, e.g., client ticketing portal 1735 and server system administration portal 1740. The main server applications may be written in JAVA. Throughout this description of the invention, it is understood that reference to the main server is not intended to limit that server to a single physical piece of hardware. The intention is to describe the two parts of the client-server architecture as simply as possible. The main server may in fact include multiple physical pieces of hardware, each performing designated tasks. Alternatively, the main server may be a single physical piece of hardware that is running dedicated software for performing different server-type tasks. One skilled in the art recognizes the various implementations of the concepts described herein. Accordingly, where designated servers are referenced herein, e.g., web application server, scoring server, these may be stand-along pieces of hardware or software modules designated to perform the described tasks.

Figure 18:
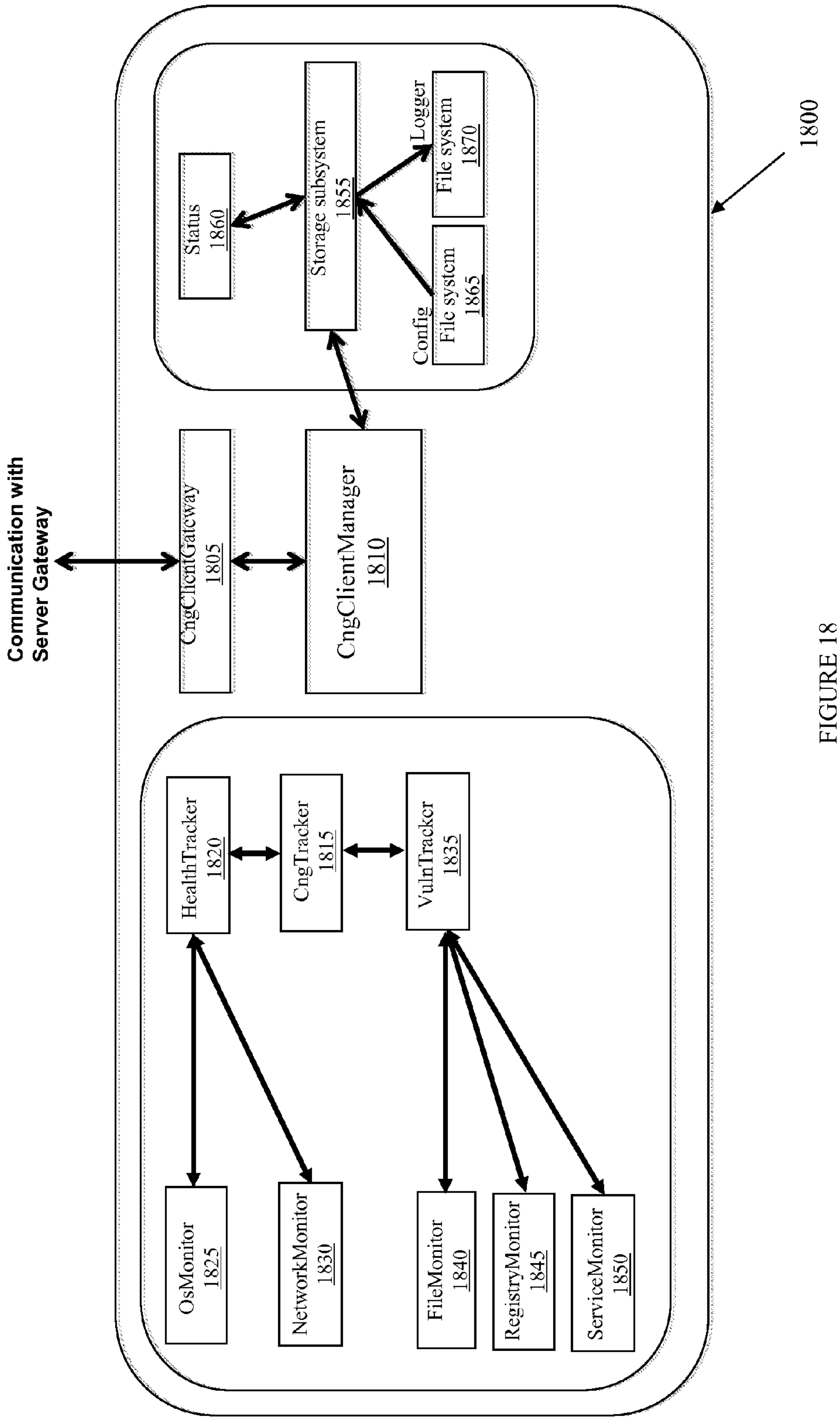
FIG. 18 illustrates a client-side architecture.

On the client target 1720, there are a numerous modules supporting client processes 1722 and communications with the main server 1710. Referring to FIG. 18, the client architecture 1800 further comprises client gateway 1805 and client configuration manager 1810. The client architecture 1800 further including at least the following modules and sub-modules communicating with the client configuration manager 1810 for implementation of the processes described herein from the client-side: Configuration Tracker 1815; Health Tracker 1820; operating system (OS) monitor 1825; Network Monitor 1830; Vulnerability Tracker 1835; File Monitor 1840; Registry Monitor 1845; Service monitor 1850. The client architecture 1800 also includes storage subsystem 1855; status subsystem 1860; configuration file system 1865 and logger file system 1870. The primary individual functionalities, uses of and communications between these modules, sub-modules, systems and subsystems are addressed below. One skilled in the art recognizes that other modules and systems are contemplated by the invention for implementation of the target monitoring and vulnerability identification described herein.

The client configuration manager 1810 performs and facilitates a variety of functions including: start-up notification, i.e., notifying the server on host start-up, shut down, crashes and status details such as IP address, hostname, MAC address, kernel version and other fingerprint information; configuration change tracking, i.e., notifies the server when changes are made to specific files, including changes from a previously recorded baseline, changes to registry keys, creation of new users, and changes to usernames; and history tracking, i.e., keeps host status and activity history locally in status file system 1860 and logger file system 1870 via storage subsystem 1855, logged by date and time in a server-recognizable format, and provides history upon server query.

The client configuration manager 1810 also monitors resiliency, working to ensure that the client is resilient to system administrator changes to the target. Since one purpose of the present invention is that the system encourages training exercises, the client runs at a higher privilege in an effort to avoid being compromised by server-driven vulnerabilities that are intended to affect the target and be spotted and fixed by the client. The client code is monitored by the OS, and restarted on an as required basis. When the participant terminates the client, the OS will restart it. If the OS in unable, then the server will report the target as failed. Thus a white team member can remedy the situation manually. Client is also first-in, last-out, i.e., first process to start-up and last process to end. Additionally, if the client is “killed” by a server-driven change, the system provides for a respawn of the client; similar to the scenario where a game-player has multiple chances or “lives” during a single running of a game.

As shown in FIG. 18, the client configuration manager 1810 also communicates through the configuration tracker module 1815 to track client health and client vulnerability. Generally, the health tracker module 1820 tracks target health and provides status reports to the server at regular intervals. The server can change the interval rate at which the client health tracker module generates the health status report. The health criteria are based on critical profile services including CPU, memory, hard disk and network usage as well as system interface upload usage in KB/s and download usage in KB/s. More particularly, the health tracker module 1820 communicates with the OS Monitor module 1825 in order to: track operating system upgrades and notify the server when a service-pack (e.g., Windows update) or new kernel (e.g., Linux, Solaris) is installed; and perform patch level tracking which tracks the system patch level and notifies the server when target software is updated, including providing version number in notification, and when a vulnerability is remediated via a software update. Similarly, the health tracker module 1820 communicates with the network monitor module 1830 in order to monitor network and web application firewalls, including tracking of firewall status, i.e., changes such as start, stop, flush, reload, opening and closure of listening ports, configuration changes and the like, as well as monitoring of vulnerable web applications to determine if/when the applications are protected by application firewalls, when the applications are blocked due to configuration changes, when an application firewall is installed and when changes are made to the application firewall configuration.

Also shown in FIG. 18, the client configuration manager 1810 communicates through the configuration tracker module 1815 with a vulnerability tracker module 1835 which in turn communicates with file monitor module 1840, registry monitor module 1845 and service monitor module 1850. The services monitor module 1850 monitors the target’s specific services and notifies the server when: unused or irrelevant target services are stopped or disabled; vulnerable services are fixed or upgraded; server is going down or coming up, new services are started. The file monitor module 1840 monitors the target’s specific files in the target’s file system and notifies the server when monitored: file permissions, file ownerships, file contents, and/or file checksums are created, deleted, and/or modified. The registry monitor module 1845 monitors the target’s configuration registry and notifies the server when monitored: key permissions, key ownerships, and/or key contents are created, deleted, and/or modified.

In a preferred embodiment, the client functionalities are written in Java and compiled to native binary implementation. The client gateway 1805 communicates with the main server 1710 via XML-RPC or JMS and all communications are SSL encrypted.

Figure 19:
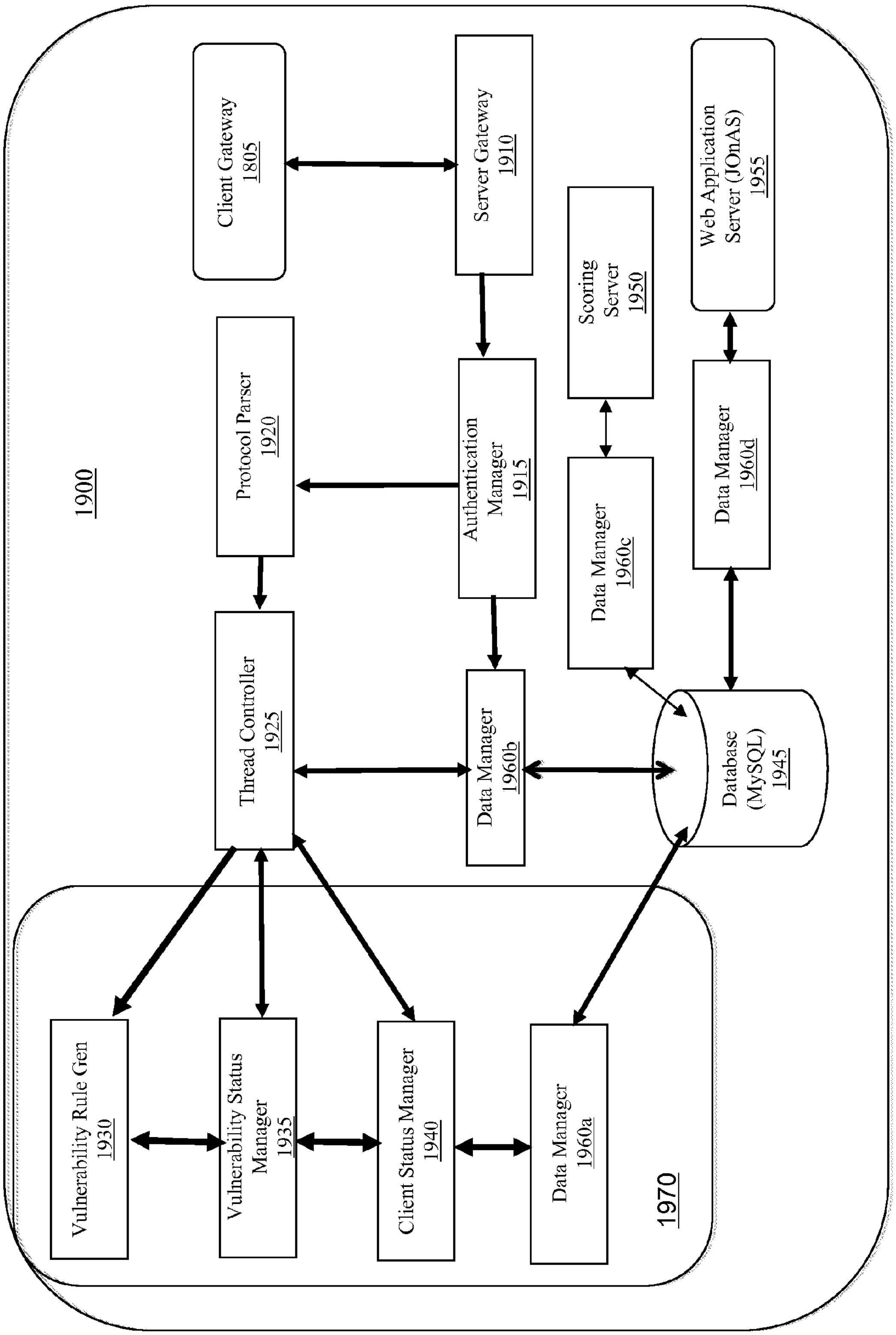
FIG. 19 illustrates a server-side architecture.

Referring to FIG. 19, a detailed view of a main server architecture 1900 according to an embodiment of the present invention includes the following components and modules: client gateway 1905; server gateway 1910; authentication manager 1915; protocol parser 1920; thread controller 1925, vulnerability rule generator 1930; vulnerability status manager 1935; client status manager 1940; database (e.g., MySQL) 1945; scoring server 1950; web application server (e.g., JOnAS) 1955 and various data managers 1960*a-d*. The primary functionalities of these components and modules are addressed below. One skilled in the art recognizes that additional components and modules are contemplated by the invention for implementation of the target monitoring and vulnerability identification described herein.

The server gateway 1910 communicates rule-based profiles generated by the vulnerability rule generator 1930 to the client via client gateway 1805. The exemplary profiles include web server, domain controller, DNS server, file server, database server, etc. These profiles may be changed by the server, which instructs the client to flush and reload the new profiles.

The web application server 1955 manages numerous function and processes, including, for example, scenario reset, secure communications between main server and client, attack generation, collaboration, target security. The web application server 1955 handles numerous requests, accessing one or more databases 1945, generating the static web pages for delivery to the client browser and displaying content to users. More particularly, the web application server 1955 generates pages for the trouble ticket interface, statistics interface and scenario management interface. The web applications may be written in PHP and deployed to the web in a web archive file (.war)

To establish initial secure communication between client and server, an exemplary authentication process includes: client broadcasts for server location which are received by the server gateway 1910; server responds to client broadcast; client authenticates to the responding server with a system fingerprint, e.g., targetname, IP address, MAC address, requested profile, etc.; and server compares using authentication manager 1915. Once authenticated, a thread controller 1925 initiates a thread to provide an initial rule-based vulnerability profile generated by vulnerability rule generated 1930. The exemplary thread cluster 1970 may include tasks for accessing, checking and updating vulnerability rules generator 1930, vulnerability status manager 1935, client status manager 1940 and data manager 1960*a*. Numerous other threads are contemplated by the invention in order to implement the processes described herein and would be known to a person having ordinary skill in the art. Additionally, post-authentication client-server communications are encrypted using SSL to thwart sniffing.

The web application server 1955 provides for collaboration amongst system administrators at the client. Client administrators can write-up trouble tickets for changes they make on their servers; comment on the trouble tickets of others; collaborate in a free text form and collaborate in chat sessions. Additionally, the web application server 1955 identifies to the client system administrator that a target is considered secure (as well as clearly labeling when hacked), i.e., a successful lockdown of a target triggers a notice to the system administrator of this accomplishment.

Further still, the web application server 1955 supports a process for delivering attacks to the client; such that the attack is immediately known to the client system administrator, e.g., windows pop-up. Exemplary attacks include use of infiltration to download client password files and attempts to crack passwords. The invention also contemplates running commercial-off-the-shelf applications to deliver attacks to the client such as Metasploit.

The data managers 1960*a-d* are selected and implemented in accordance with the required functionalities of the various servers and components. The selection and implementation would be well within the knowledge of a person having ordinary skill in the art of programming and networking. Similarly, protocol parser 1920 reads in the configuration definitions of the OVAL (Open Vulnerability and Assessment Language) vulnerabilities as defined in the system and parses them into the appropriate system format.

All client-server communications are logged. As discussed above with respect to the client server, a log and history is maintained on the client side. Similarly, all messages sent to the server, as well as actions performed by the server, are logged and tabulated at database 1945 so that the client and server administrators can run reports, including statistical analyses, and score appropriately.

In addition to the particular modules described above, other modules may be used to implement a secure and dynamically configurable rule-based system in accordance with the present invention which: can be configured during runtime to monitor files, services, registry, etc.; includes profiles containing granular rules that may be aggregate; facilitates additions of new rules or changes to existing rules to a specific target during assessment; requires immediate updates and compliance with rules changes by client; includes specification of files and/or registry keys to watch and services to monitor.

The communications between client and server are governed by a particular protocol that is design to minimize the number of server-client exchanges. An exemplary protocol specification in accordance with the present invention is described below. In the following example, the protocol is a XML based messaging protocol and its intended delivery is XML-RPC although other forms such as JSM may also be supported.

Server messages are messages that are generated by clients and consumed by the server. These messages are encapsulated by the server-tag. A client acknowledges the server when a server message has been received. FIGS. 21*a* and 21*b* illustrate an exemplary acknowledge ("ACK") state diagram. FIG. 21*a* shows ACK: QUIT and FIG. 21*b* shows ACK: RESET. Message transmissions are controlled via the ACK message. The following acknowledgements are supported: OK: success; RESET: resend command; ERROR: an error occurred; QUIT: Too many errors occurred, stop all transmissions; and EXPIRED: The session has expired. The client should expect acknowledgement for all messages unless specified in the protocol description, e.g. the HEALTH message. If no ACK message is received, the client should retransmit the last message. An exemplary ACK message is shown in FIG. 21*c*.

It is expected that different clients may support different versions of the protocol. The client sends the version of the protocol it supports. FIGS. 22*a* and 22*b* illustrate exemplary versioning diagrams in accordance with the present invention. On initial startup the client will connect to the server and perform a version handshake, the lowest version supported by either party will be used. This version will be used for all future communication between the server and client until the client is issued a RESET command. Making sure that the server and client agree on a protocol version will give the system extensibility in the future. More particularly, when the client initially starts, it sends the highest version of the protocol it supports in a VERSION message. If the server responds with an ACK: RESET message then the next lower supported version of the protocol will be sent again in a VERSION message. This process will continue until the server transmits an ACK: OK message i.e. a version of the protocol has been agreed upon or the client is sent an ACK: QUIT command. An exemplary VERSION message is shown in FIG. 22*c*.

Figure 23A:
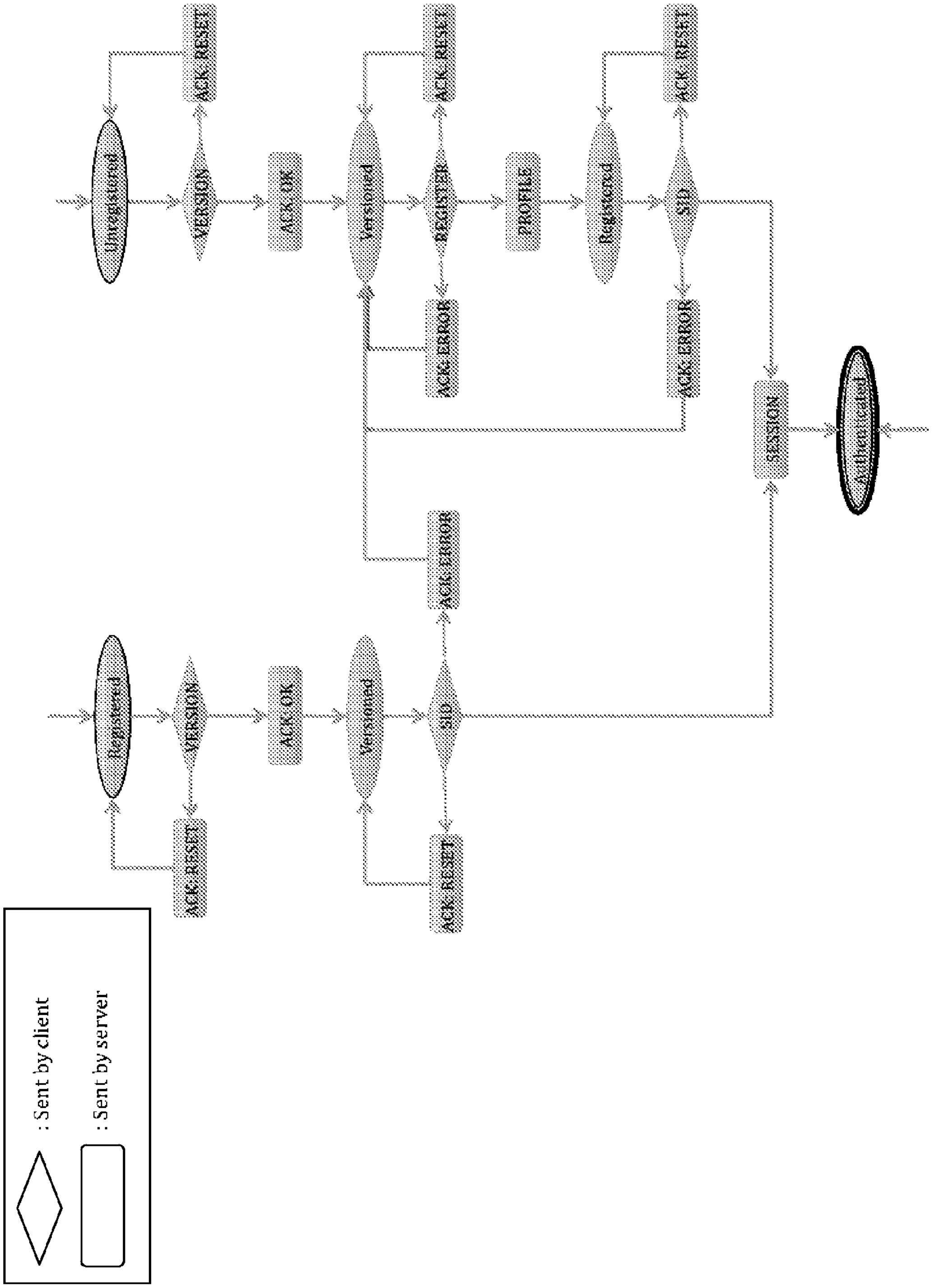
FIG. 23*a* illustrates a REGISTER state in accordance with the communication protocol of the present invention.

The REGISTER or registration message provides the server with fingerprint information that the server will use to generate a System ID (SID) and use it to track the target. This is also called authentication. An exemplary authentication diagram is shown in FIG. 23*a*. The registration message transmits the following information: Targetname; Network Information; Kernel/OS Information; Processor(s) type(s); and Amount of RAM. Once the protocol version has been agreed to per the versioning steps described above, the client will send a REGISTER message. If registration is successful then the server will reply with a PROFILE message. If registration is unsuccessful then the server will reply with either an ACK: ERROR or an ACK: RESET notifying the client that either an internal error occurred or that the last message was not received (respectively). The client will try to reregister until it is successful, it is given an ACK: QUIT message or it makes a predetermined number of attempts. In a preferred embodiment, the client authentication process takes less than 15 seconds. An exemplary REGISTER message is shown in FIG. 23*b*.

Once registered, the client sends its authentication token or System ID ("SID") (a 32-character string) via a SID message. The SID message is used to keep track of the target identity. The SID message will also be transmitted whenever the ACK: EXPIRED message is received in order to refresh the client's Session ID (see client SID message). An exemplary SID message is shown in FIG. 24.

Figures 25A, 25B:
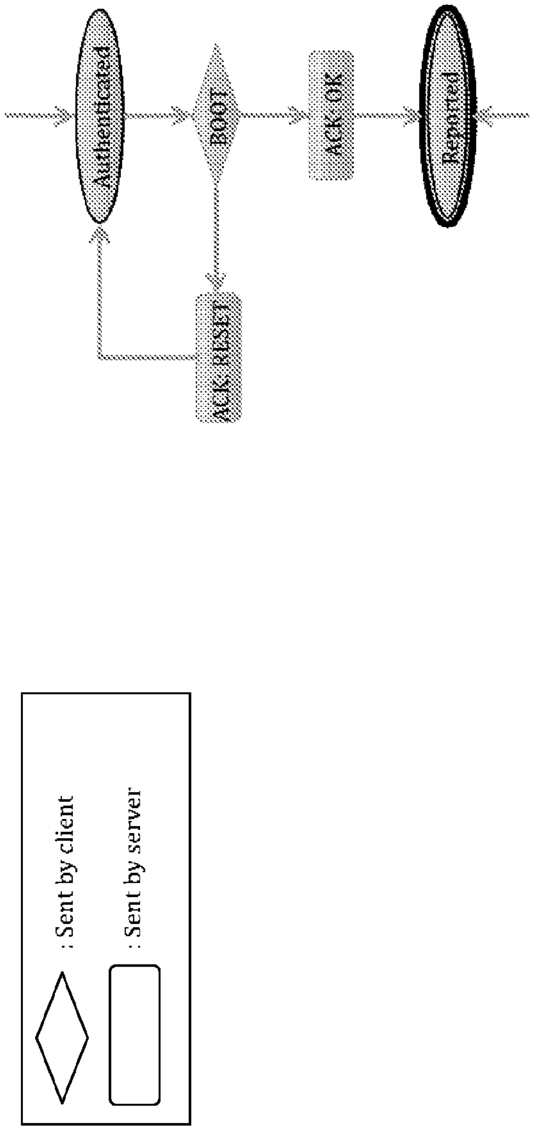
FIG. 25*a* illustrates a BOOT state in accordance with the communication protocol of the present invention.
FIG. 25*b* illustrates a client generated BOOT message in accordance with the communication protocol of the present invention.

In order to keep track of client uptime the client will communicate via the BOOT message, which notifies the server when the client is going down and when it comes back online. If possible the client will also notify the server when it's going for a reboot. This message will only be transmitted after the System ID (SID) has been assigned and the profile has been transmitted. An exemplary BOOT state diagram is shown in FIG. 25*a*. The BOOT message can take the following forms: DOWN: the target is shutting down; REBOOT: the target is rebooting; UP: The target started. Once the target is registered, it will notify the server whenever it is shutting down by sending a DOWN or REBOOT BOOT message. If the client does not receive an OK ACK message, it will retransmit this information when it comes back up followed by an UP BOOT message. An exemplary BOOT message is shown in FIG. 25*b*.

Figures 26A, 26B:
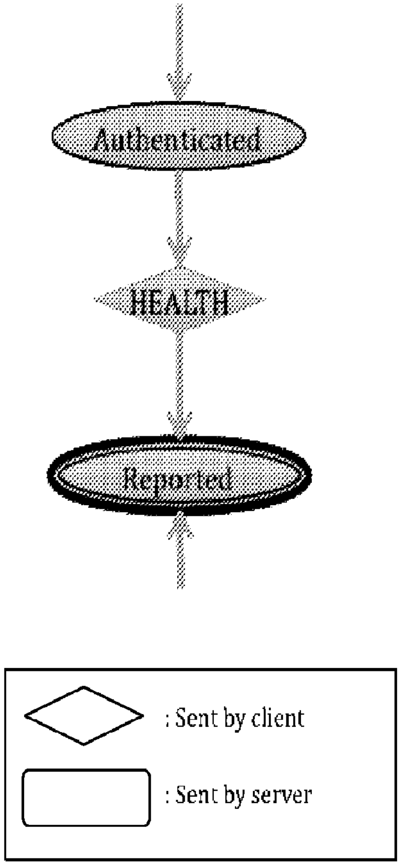
FIG. 26*a* illustrates a HEALTH state in accordance with the communication protocol of the present invention.
FIG. 26*b* illustrates a client generated HEALTH message in accordance with the communication protocol of the present invention.

The HEALTH message provides regular (keep-alive) health status updates. HEALTH messages report system health: CPU, memory, hard disk and network usage. Given these system measurements, the server will rate the system health between 1 and 10, a reading that the front-end will reflect. If the server does not receive this message within two cycles of the allotted time, the server will mark the target as problematic and alert the administrator. Exemplary HEALTH message fields include: cpu: percentage of CPU used; mem: percent of used memory; disks: hard disk usage; part: disk partition; name: the partition label; full: the partition usage in percent. Additionally, the message includes information about the system interfaces. For each interface the message includes: name: the name of the interface; up: upload usage in KB/s; and down: download usage in KB/s. Once the target is registered, it will notify the server once every set number of seconds of its standing health via a HEALTH message. This message is not replied to and its reporting time may be changed by the THROTTLE message (discussed below). An exemplary HEALTH state diagram is shown in FIG. 26*a* and an exemplary HEALTH message is shown in FIG. 26*b*.

All client messages, i.e., messages generated by the server and directed to the client, will include the time and date as well as message and session IDs as part of the message body. The session ID will expire at predetermined time, e.g., every 60 minutes. The client message fields include: time: date and time; msgid: the message ID (6-digit number); session: and the session ID (32-character string). An exemplary message, including metadata information is shown in FIG. 20.

Figures 27A, 27B:
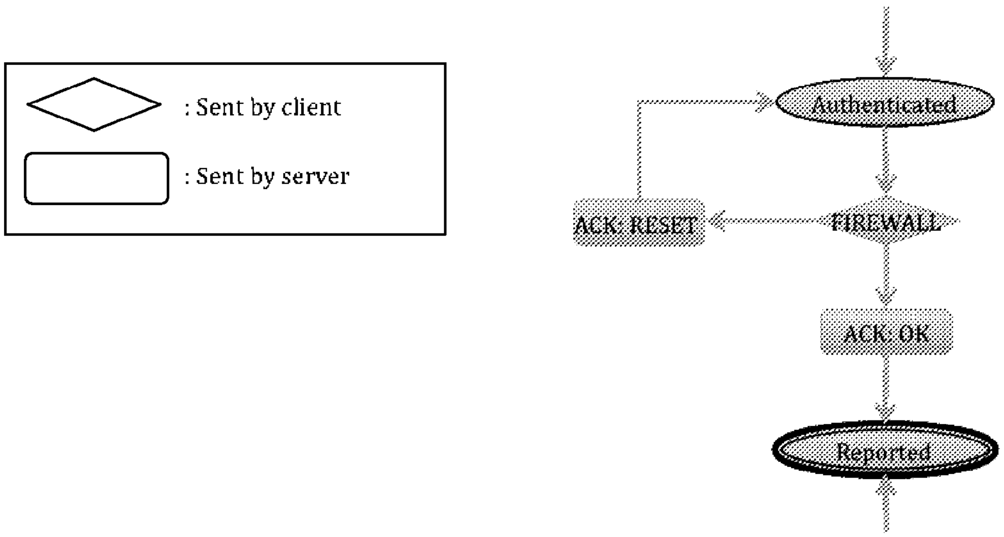
FIG. 27*a* illustrates a FIREWALL state in accordance with the communication protocol of the present invention.
FIG. 27*b* illustrates a client generated FIREWALL message in accordance with the communication protocol of the present invention.

The Client notifies the server when a firewall configuration change is made. The FIREWALL message is used to communicate target firewall status, which may be up, down or none (firewall not installed). The FIREWALL message will also be transmitted when individual rule changes are made. The FIREWALL message will be transmitted any time system administrators make changes to system firewalls. An exemplary FIREWALL state diagram is shown in FIG. 27*a* and an exemplary FIREWALL message is shown in FIG. 27*b*.

Figures 28A, 28B:
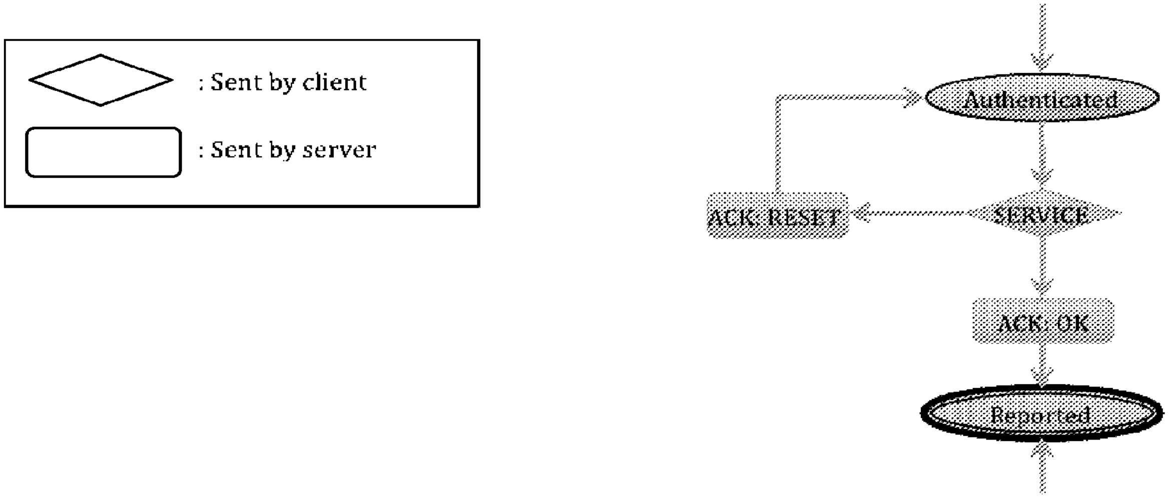
FIG. 28*a* illustrates a SERVICE state in accordance with the communication protocol of the present invention.
FIG. 28*b* illustrates a client generated SERVICE message in accordance with the communication protocol of the present invention.

The Client notifies the server when a service is manually stopped, started or restarted. SERVICE messages are used to communicate service (or daemon) status. The client needs to report when a service is manually stopped, started or restarted by a system administrator and if the service crashes. All SERVICE messages include a reason for reporting, valid reasons are either manual or error. Manual means that the system administrator manually made the change, while error messages mean that the server crashed unexpectedly. The SERVICE message will be transmitted when any service is manually changed or if a service unexpectedly stops. An exemplary SERVICE state diagram is shown in FIG. 28*a* and an exemplary SERVICE message is shown in FIG. 28*b*.

Figures 29A, 29B:
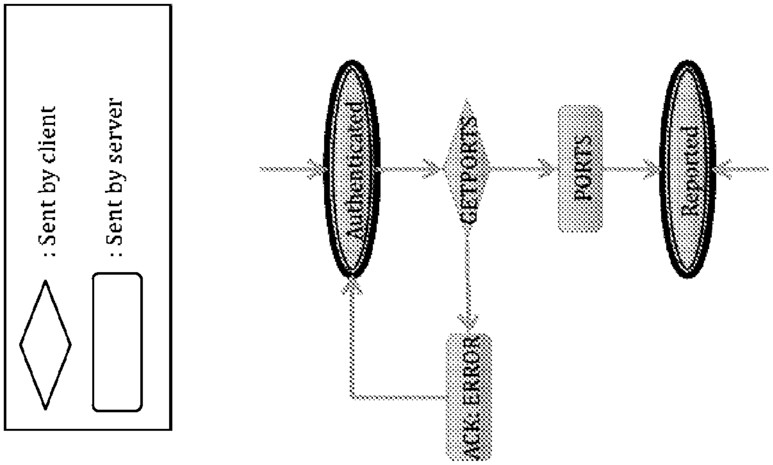
FIG. 29*a* illustrates a GETPORTS state in accordance with the communication protocol of the present invention.
FIG. 29*b* illustrates a client generated GETPORTS message in accordance with the communication protocol of the present invention.

The Client uses the PORTS message as a response to the GETPORTS message (discussed below) and requires no acknowledgement from the server. Anytime after receiving its SID (authenticated), the client may receive a GETPORTS message from the server. The client responds to GETPORTS with PORTS message including all open TCP and UDP ports and all monitored closed TCP and UDP ports. An exemplary PORTS state diagram is shown in FIG. 29*a* and an exemplary PORTS message is shown in FIG. 29*b*.

Client sends a VULNFIXED message to the server whenever the system administrator fixes a target vulnerability per the given profile. The only thing the server needs is the vulnerability ID as transmitted in the PROFILE message. An exemplary VULNFIXED message is shown in FIG. 30.

Figures 31A, 31B:
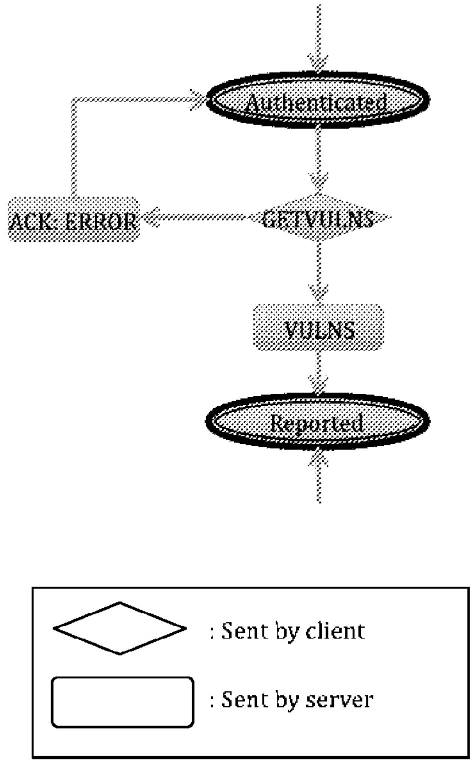
FIG. 31*a* illustrates a VULNS state in accordance with the communication protocol of the present invention.
FIG. 31*b* illustrates a client generated VULNS message in accordance with the communication protocol of the present invention.

Client responds to GETVULNS (discussed below) with the VULNS message outlining fixed and existing vulnerabilities. The fixed subsection simply includes a list of vulnerability IDs that have been fixed by the system administrator while the existing subsection includes a list of vulnerabilities not yet addressed. The VULNS message is sent as a reply to the GETVULNS message. An exemplary VULNS state diagram is shown in FIG. 31*a* and an exemplary VULNS message is shown in FIG. 31*b*.

As discussed above, client messages are generated by the server and consumed by the client. Similar to the server messages described herein, the server generates client VERSION and ACK messages in the same format as the server messages. Exemplary VERSION and ACK client messages are shown in FIGS. 32 and 33.

Figure 34A:
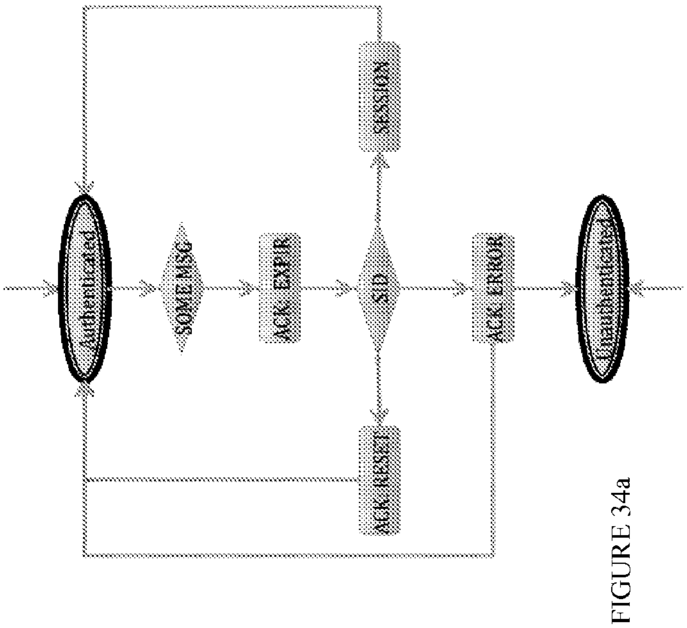
FIG. 34*a* illustrates a SESSION state in accordance with the communication protocol of the present invention.
Figure 34B:
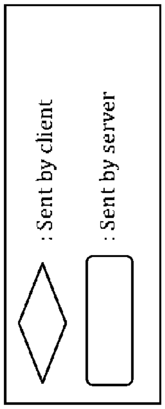
FIG. 34*b* illustrates a server generated SESSION message in accordance with the communication protocol of the present invention.

The SESSION message is used during authentication to initiate a session and upon reinitiation of a session. The SESSION message contains the Session ID as well as its expiration time in milliseconds (predefined time, recommended 60 minutes). After expiry, any message sent with the expired Session ID will be replied to with the ACK: EXPIRED message. The client may resend a server SID message to which the server will respond with a SESSION message containing a new Session ID and expiration. An exemplary SESSION state diagram is shown in FIG. 34*a* and an exemplary SESSION message is shown in FIG. 34*b*.

The PROFILE message is a reply to the client's REGISTER message. The client SID (a 32-character string) is generated from the registration information and used to identify the client. The System ID should be kept secret and not displayed on the frontend. Along with the SID, all vulnerabilities the client is responsible for are also sent in the vulnerabilities subsection. Vulnerability subsections have a precedence (prec), which dictates the priority in which these fixes should be administered. The Vulnerabilities subsection includes: id: the vulnerability ID; services: services to monitor; keys: registry keys to monitor; and bin: a binary to monitor. The Services include: name: the system service name and action: the action that should be taken on the service, such as, disable: the service is supposed to be disabled, enable: the service should be set to automatic and started, restart: the service should be restarted. The Registry Keys include: keyname: the registry key name; valuename: the name of the value to be monitored; and value: the expected value. Finally, the Binaries include: file: the full path to a file to be monitored; version: the expected binary version; and md5: the expected checksum of the binary. An exemplary PROFILE message is shown in FIG. 35.

The server sends the PASSCHECK message any time after the client has been authenticated to check if the system administrator has changed a weak password in the system. The server will simply send the username and password to check. The client will respond with an ACK: OK message if the weak password has been changed and the ACK: RESET if the password remains unchanged. An exemplary PASSCHECK message is shown in FIG. 36.

The THROTTLE message is sent by the server any time to change the frequency of HEALTH message reporting. When the THROTTLE message is received by the client, the client adjusts its internal reporting interval and responds with an ACK message. An exemplary THROTTLE message is shown in FIG. 37 and shows that the server is requesting that the client provide health reporting every 2 minutes and 15 seconds.

The GETPORTS message allows the server to arbitrarily query the client for a list of open ports.

The server sends a GETPORTS message and the client responds with a PORTS message. See PORTS message protocol above. An exemplary GETPORTS message is shown in FIG. 38.

The GETVULNS message allows the server to arbitrarily query the client for a list of fixed and unfixed vulnerabilities. The vulnerabilities are outlined in the initial profile received by the client. When the server sends a GETVULNS message, the client responds with a VULNS message. See VULNS message protocol above. An exemplary GETVULNS message is shown in FIG. 39.

Figure 40:
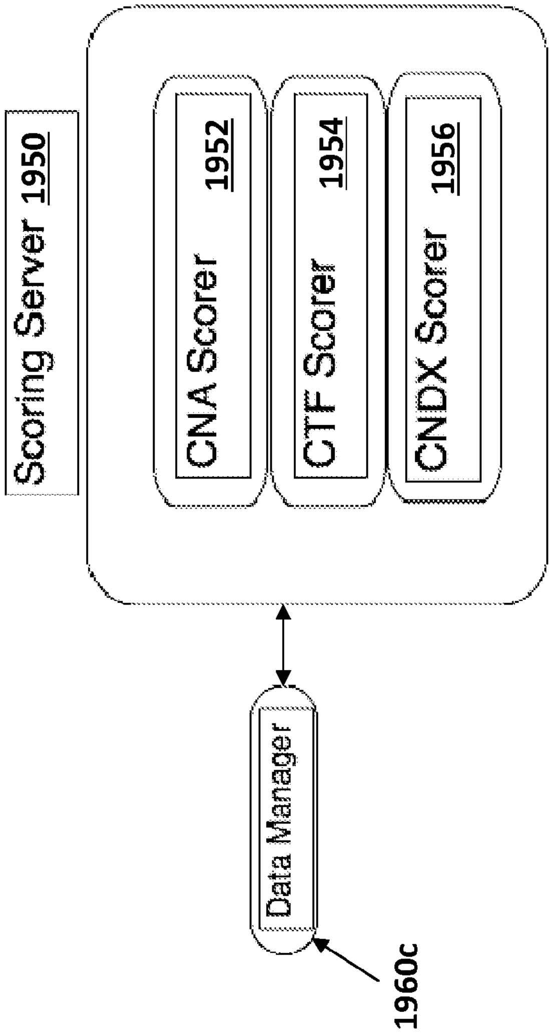
FIG. 40 illustrates a scoring server configuration.

A key component to numerous embodiments of the present invention are the scoring processes controlled by the scoring server 1950 (also shown as 1714) and formatted for display by the web application server 1955 (also shown as 1712). The scoring server is disconnected from the client-server communications described herein as the scoring server only communicates internally with the at least one database 1945 (also shown as 1718) through data manager 1960*c*. The at least one database 1945 is populated with scoring information from the client-server communications. As shown in FIG. 40, the scoring server 1950 includes modules facilitating CNA scoring 1952, CTF scoring 1954 and CND scoring 1956. The applied scoring techniques differ depending on the type of network defensive, offensive, investigative scenario that is being implemented. Some of the contemplated scenarios include: Capture The Flag (CTF), which can be an offensive or mixed offensive and defensive scenario intended to track flag/target capture and pits team against team; CNA (computer network attack), which is an offensive scenario intended to track assessment and capture of target vulnerabilities; CND (computer network defense), a defensive scenario which scores trouble tickets and tracks attacks which affect score; Forensics and data recovery, which will track and measure the effectiveness of the participants in finding malware and identifying its' capabilities; Wireless, which will track and measure the ability for the participants to both attack and defend an 802.11 wireless network; SCADA and other remote and mobile devices which will track and measure the participants ability to monitor and maintain control of a distributed control infrastructure; IPv6 which will provide an enhanced IPv6 implementations of the targets and vulnerabilities to track and measure the effectiveness of the students to defend in the next generation of IP space; Web Application Security (SQL injection, XSS, etc.) which will focus the tracking and measurements of the system to a specific application to better gauge the ability of the participants in specific application configuration and management; Denial of Service and Botnets which will track and measure the participants capabilities in exploiting a botnet command and control infrastructure to regain control or to leverage an existing botnet to further prosecute measurable impacts; Exploit Engineering—Fuzzing and basic overflows which will track and measure the capabilities of the participants in their investigation and exploitation of unknown vulnerabilities and measure the capabilities for a participant to gain control via exploitation; and, hacker versus hacker which will track and measure multiple participants in a no-holds barred exercise to gain total control of the entire target community.

Figure 41:
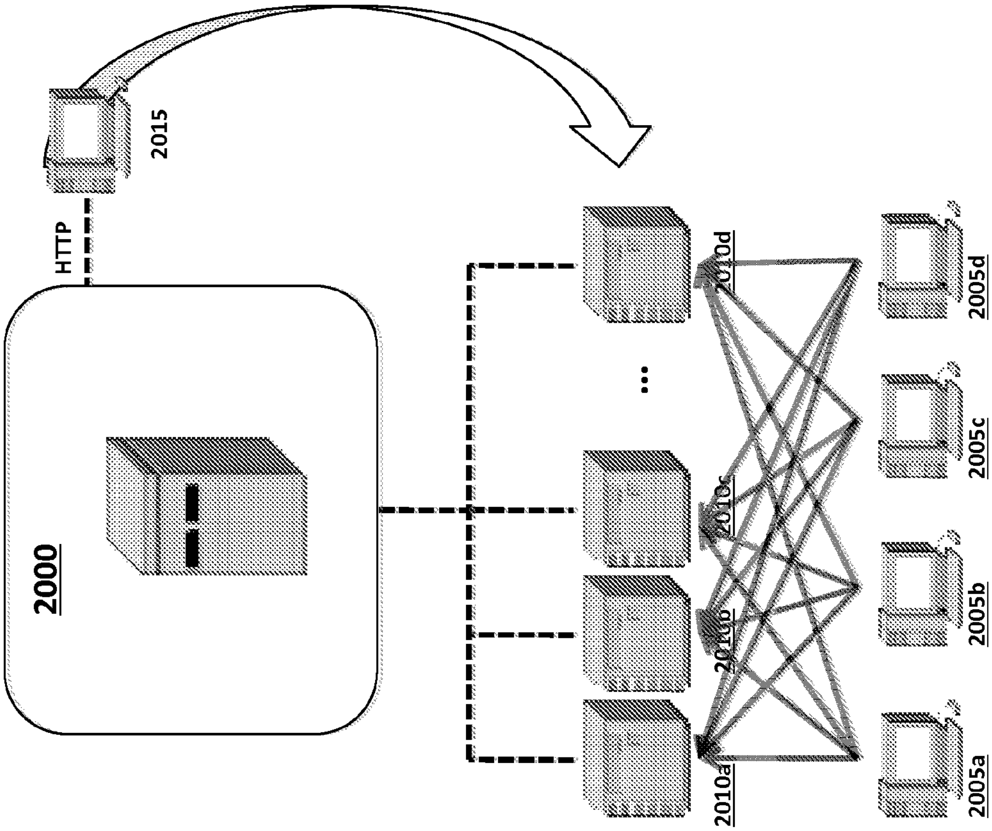
FIG. 41 illustrates an offensive scenario architecture.

Referring to FIG. 41, the schematic illustrates exemplary users and information flow in an offensive scenario, e.g., CTF. The main server 2000 facilitates game play between users/teams 2005*a-d* as they attempt to plant, remove and steal flags from various targets, i.e., computers, servers, networks running various operating systems (e.g., Windows, Linux, Solaris, OSX) with varying levels of security as exemplified by 2010*a-d* in FIG. 41. The administrators 2015 monitor the teams 2005*a-d* for fair play. The flags or targets can be particular files located on secure computers/networks and stealing would require penetrating the computer/server and retrieving the file. In a purely offensive scenario, all teams are racing to capture the same flag or plant their flag first. In a mixed offensive and defensive scenario, teams might both be defending against flag capture and attempting to capture another team's flags. For CTF, scoring functionality may include determining which team can capture and keep targets over the longest period of time. The CTF rules include: limited game duration, points for flag plant, flag removal and target stolen.

For CNA, scoring functionality is intended to show which team can assess and capture as many targets the fastest. The CNA rules include: limited game duration or first to score value; one time target/vulnerability pair capture per team; points for root compromise flag plant, which entails placement in root directory or Admin user; file exposure flag plant or report, which entails placement in user directory or data location or key in value stored in insecure location; points for information disclosure flag plant, which entails placement in non-secured location or key in value stored in insecure location.

Figure 42:
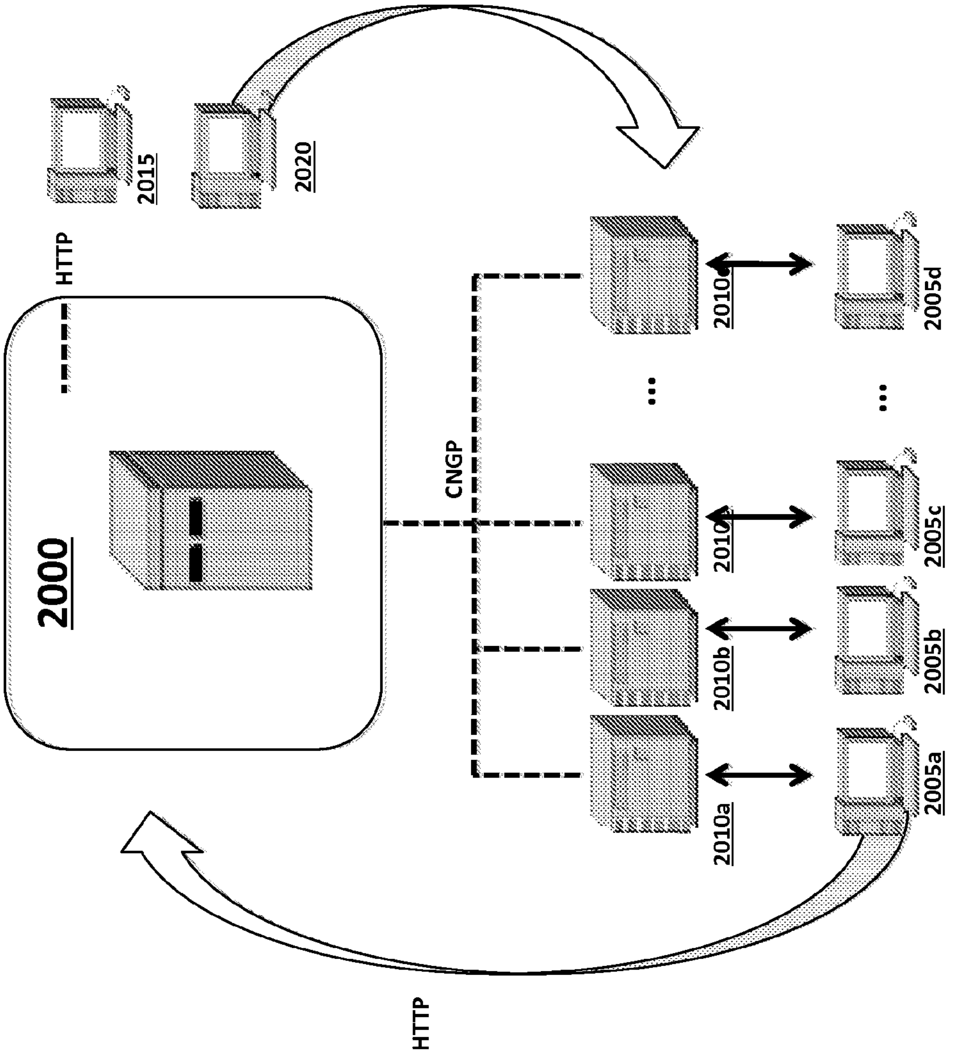
FIG. 42 illustrates a defensive scenario architecture.

For CND, the scoring functionality provides for aid instruction, measurement of team performance and reliability, and repeatable scoring of teams. The functionality gives instructors real-time view into the exercise; permits identification and focused training on weak areas during the exercise; tracks multiple values over time; provides quantitative measure of ability to keep the business operational; permits performance trend analysis to measure progress; shows ebb and flow of team focus during exercise; allows evaluation against best practices, evaluates performance across multiple factors; provides complete history of exercise; and provides full documentation to put performance in context. Referring to FIG. 42, the schematic illustrates exemplary users and information flow in a defensive scenario, e.g., CTF. The main server 2000 facilitates hacking of various targets, i.e., computers, servers, networks running various operating systems (e.g., Windows, Linux, Solaris, OSX) with varying levels of security 2010*a-d* by hacker applications 2020, e.g., Metasploit. The users/ teams 2005_a-d_ are responsible for monitoring their assigned targets 2010_a-d_ and reporting trouble tickets as they spot and implemented fixes to vulnerabilities. The administrator 2015 runs the scenario and allocates points for trouble tickets.

In an exemplary CND scoring design, scores are normalized based on percentage of vulnerabilities and their value. By way of example, high value resolutions could include: remote Admin/Root compromise; remote user compromise; and privilege escalation. Medium value resolutions could include service exploitation. Low value resolution could include modification of date. Minor resolution could include information leakage. Additionally, information resolution could include running an extraneous service. As shown in exemplary FIGS. 5, 7 and 10, a comprehensive score chart shows the combined perspective of the targets. If a target is reachable via ICMP (Internet Control Message Protocol), it can be scored, if it isn't reachable the score is 0. In a preferred embodiment, the score is built on the total negative value of each vulnerability (rated from 1 to 10). So, for example: Remote Root/Administrator Access Vulnerability=10; Service Exploitation Vulnerability=7; Modification of Data Vulnerability=5; Information Leakage Vulnerability=3; and Extraneous Service running=1. Then the values of each critical service (as based on the System Weight) is calculated as a positive value. To that value the trouble ticket values are added, and then the entire total is normalized to a scale of 0-100. Thus a system that starts with all it's critical services running and with all it's vulnerable services will not start at zero. But, if a critical service is turned off, then the score will drop. Finally, the score is adjusted based on the exercise time. For example, a vulnerability that is not fixed until 7 hours into an exercise, has less weight on the score as the same vulnerability fixed in the first 15 minutes of the exercise.

Further to the CND scoring design, trouble tickets generated by clients (see FIGS. 4, 12-14 and 16) are scored depending on various factors, e.g., negative points for installing tools or fixing without requisite approval and increasing number of positive points depending on whether problem is merely noticed, problem is confirmed by system, fix suggested, fix implemented. And there is a significant deduction for allowing the monitored system to be compromised.

As is evident to a person skilled in the art, various components and embodiments of the invention described herein can take the form of an entirely hardware embodiment, an entirely software embodiment or an embodiment containing both hardware and software elements. Software implementations include, but are not limited to, firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device. The medium can utilize electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The embodiments set forth herein are intended to be exemplary of the described inventive concepts and are in no way intended to limit the scope of the invention thereto. One skilled in the art recognizes the numerous variations that are inherently contemplated by the invention as described.

The invention claimed is:

1. A process for facilitating a client system defense training exercise implemented over a client-server architecture comprising:

sending a protocol version identification message by a client system including at least one computer to a first server for determining a the protocol version common to both the client computer and the first server;

sending a registration request message by the client system to a first server for registering the client computer with the first server;

sending a system identification message by the client system to a first server for tracking the client identity;

sending a profile message by the first server to the client system in response to successful registration by the client system, the profile message including a list of vulnerabilities with associated vulnerability identifiers (IDs) that the client is to monitor;

sending a health message by the client system to the first server at predetermined intervals, the health message including information regarding at least one of client system CPU, memory, hard disk, network and interfaces;

sending a vulnerability fixed message by the client system to the first server each time one of the vulnerabilities on the list of vulnerabilities has been fixed, the vulnerability fixed messages including the associated vulnerability ID for each fixed vulnerability;

sending a list vulnerabilities message by the first server to the client system, requesting a listing of all current client system vulnerabilities by associated vulnerability ID;

sending a list of current vulnerabilities message by the client system to the first server in response to the list vulnerabilities message from the first server;

storing details from the profile message, one or more health messages, one or more vulnerability fixed messages and one or more list of current vulnerabilities messages in at least one database associated with the first server;

accessing the details stored in the at least one database by a second server;

applying a set of scoring rules to the accessed details by the second server to determine an objective score for a client system administrator that is indicative of the client system administrator's ability to defend the client system against vulnerabilities.

2. The process according to claim 1, wherein the registration request message includes one or more of the following client name, client network information, operating system information, processor information.

3. The process according to claim 1, further comprising: changing the predetermined interval at which the client computer sends a health message by sending a throttle message by the server to the client computer indicating a new predetermined interval.

4. The process according to claim 1, wherein the CPU information includes percentage of CPU used, the memory information includes percent of memory used, the interface information includes upload and download usage data.

5. The process according to claim 1, further comprising: sending a boot message by the client system to the server indicating when the client is shutting down, rebooting or starting up.

6. The process according to claim 1, further comprising: sending a firewall message by the client system to the server indicating client system firewall changes including firewall up, firewall down or no firewall.

7. The process according to claim 1, further comprising: sending a services message by the client system to the server indicating when a client service is manually stopped, started or restarted.

8. The process according to claim 1, further comprising: sending a request for vulnerabilities status message by the server to the client system.

9. The process according to claim 8, further comprising: sending a vulnerability status message from the client system to the server in response to the request for vulnerabilities status message, the vulnerability status message containing status for all vulnerabilities on the list of vulnerabilities, fixed and unfixed.

10. A process for scoring a client system defense training exercise implemented over a client-server architecture comprising:

sending a profile message by a first server to a client system including at least one computer, the profile message including a list of client system vulnerabilities with associated vulnerability identifiers (IDs);

performing at least one of the following by an administrator of the client system:

identifying client system vulnerabilities;

exploiting client system vulnerabilities;

fixing exploited client system vulnerabilities;

generating a vulnerability fixed message by the administrator and sending to the first server each time one of the vulnerabilities on the list of vulnerabilities has been fixed, the vulnerability fixed messages including the associated vulnerability ID for each fixed vulnerability;

sending a list vulnerabilities message by the first server to the client system, requesting a listing of all current client system vulnerabilities by associated vulnerability ID;

sending a list of current vulnerabilities message by the client system to the first server in response to the list vulnerabilities message from the first server;

storing details from the profile message, one or more vulnerability fixed messages, and one or more list of current vulnerabilities messages in at least one database associated with the first server;

accessing the details stored in the at least one database by a second server; and applying a set of scoring rules to the accessed details by the second server to determine an objective score for the administrator that is indicative of the administrator's ability to identify, exploit or fix client system vulnerabilities.

* * * * *